US011296070B2

(12) United States Patent
Peng et al.

(10) Patent No.: US 11,296,070 B2
(45) Date of Patent: Apr. 5, 2022

(54) INTEGRATED CIRCUIT WITH BACKSIDE POWER RAIL AND BACKSIDE INTERCONNECT

(71) Applicant: Taiwan Semiconductor Manufacturing Company Limited, Hsinchu (TW)

(72) Inventors: Shih-Wei Peng, Hsinchu (TW); Guo-Huei Wu, Tainan (TW); Jiann-Tyng Tzeng, Hsinchu (TW)

(73) Assignee: TAIWAN SEMICONDUCTOR MANUFACTURING COMPANY LIMITED, Hsinchu (TW)

( * ) Notice: Subject to any disclaimer, the term of this patent is extended or adjusted under 35 U.S.C. 154(b) by 57 days.

(21) Appl. No.: 16/900,687

(22) Filed: Jun. 12, 2020

(65) Prior Publication Data

US 2021/0391318 A1 Dec. 16, 2021

(51) Int. Cl.

| | |
|---|---|
| ***H01L 27/02*** | (2006.01) |
| ***H01L 27/092*** | (2006.01) |
| ***H01L 23/528*** | (2006.01) |
| ***H01L 21/8238*** | (2006.01) |
| ***G06F 30/392*** | (2020.01) |
| ***G06F 30/394*** | (2020.01) |
| *G06F 119/18* | (2020.01) |

(52) U.S. Cl.

CPC ........ *H01L 27/0207* (2013.01); *G06F 30/392* (2020.01); *G06F 30/394* (2020.01); *H01L 21/823821* (2013.01); *H01L 21/823871* (2013.01); *H01L 23/5286* (2013.01); *H01L 27/0924* (2013.01); *G06F 2119/18* (2020.01)

(58) Field of Classification Search

CPC ..... H01L 21/823821; H01L 21/823871; H01L 23/5286; H01L 27/0207; H01L 27/0924

See application file for complete search history.

(56) References Cited

U.S. PATENT DOCUMENTS

| | | | | |
|---|---|---|---|---|
| 2019/0164882 | A1 | 5/2019 | Chen et al. | |
| 2020/0035560 | A1 | 1/2020 | Block et al. | |
| 2020/0135646 | A1 * | 4/2020 | Rubin | H01L 23/481 |
| 2020/0135735 | A1 * | 4/2020 | Sengupta | H01L 27/0922 |

FOREIGN PATENT DOCUMENTS

| | | | |
|---|---|---|---|
| DE | 11 2016 007 503 | T5 | 2/2020 |
| WO | WO-2017/111792 | A1 | 6/2017 |

* cited by examiner

*Primary Examiner* — Christine A Enad

(74) *Attorney, Agent, or Firm* — Foley & Lardner LLP

(57) ABSTRACT

Disclosed embodiments herein relate to an integrated circuit including metal rails. In one aspect, the integrated circuit includes a first layer including a first metal rail and a second layer including a second metal rail, where the second layer is above the first layer along a first direction. In one aspect, the integrated circuit includes a third layer including an active region of a transistor, where the third layer is above the second layer along the first direction. In one aspect, the integrated circuit includes a fourth layer including a third metal rail, where the fourth layer is above the third layer along the first direction. In one aspect, the integrated circuit includes a fifth layer including a fourth metal rail, where the fifth layer is above the fourth layer along the first direction.

20 Claims, 22 Drawing Sheets

INTEGRATED CIRCUIT WITH BACKSIDE POWER RAIL AND BACKSIDE INTERCONNECT

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout patterns for integrated circuits while ensuring that the standard cell layout designs and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figures 1A, 1B, 1C:
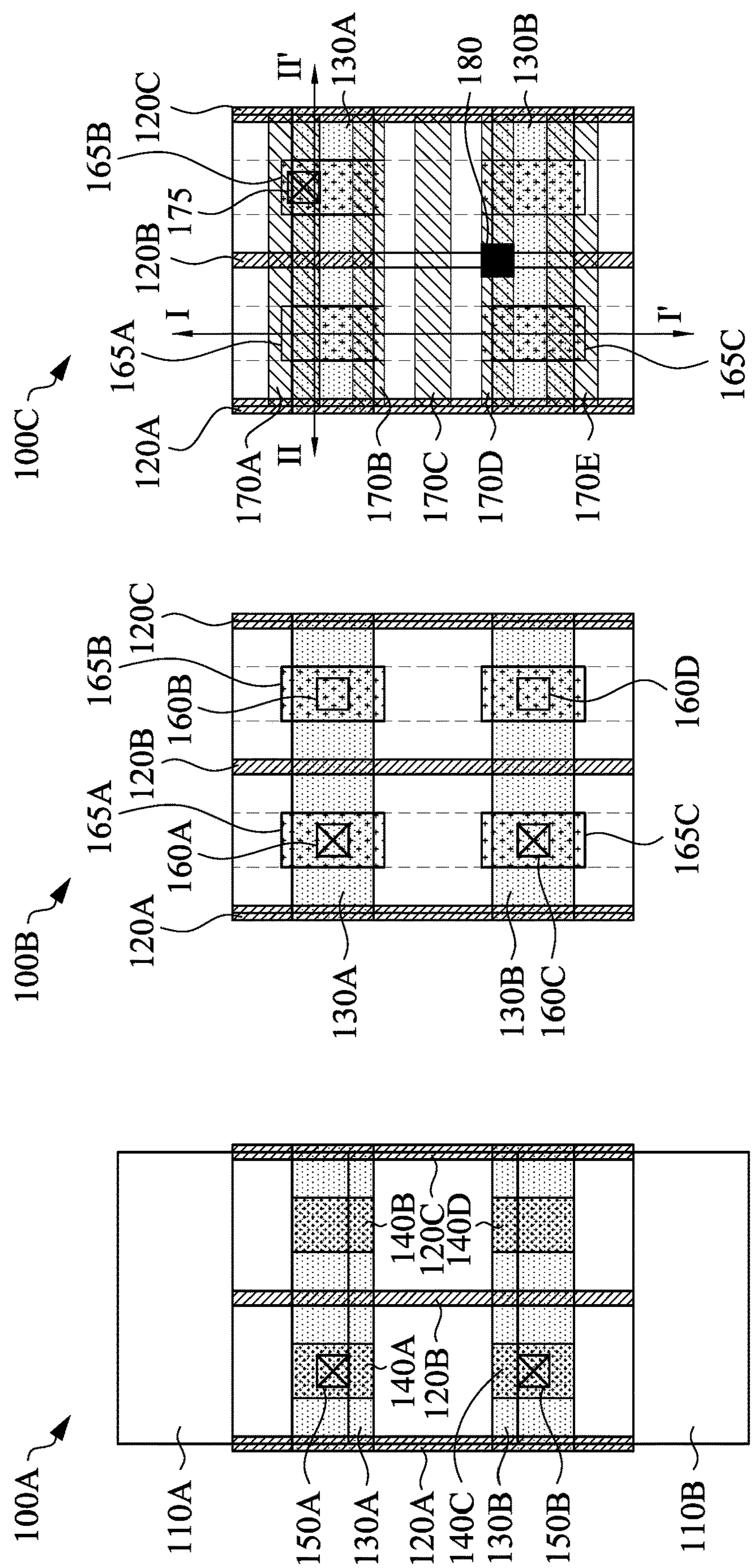
FIGS. 1A-1C are top plan views of a layout design of a circuit including a backside power rail and a backside metal rail, in accordance with one embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, disclosed herein is related to an integrated circuit including a backside power rail and backside routing rails. In one aspect, the integrated circuit includes active regions forming a large number of transistors, multiple layers of metal rails on a front side of the active regions, and at least two layers of metal rails on a backside of the active regions. An active region is a semiconductor structure having either n-type or p-type doping. Metal rails on the front side of the active regions may be referred to as "front side metal rails," where metal rails on the front side of the active regions for providing electrical signal or used as a local interconnect may be referred to as "front side interconnect rails." In addition, metal rails on a backside of the active regions may be referred to as "backside metal rails," where metal rails on the backside of the active regions for providing supply voltage or power may be referred to as "backside power rails," and metal rails on the backside of the active regions for providing electrical signal or used as a local interconnect may be referred to as "backside interconnect rails."

In some embodiments, a first layer of metal rails on the backside of the active regions can be disposed closer to the active regions compared to the metal rails on the front side, and provide more reliable supply voltage (e.g., VDD or GND) to the active regions than the metal rails on the front side. In addition, a second layer of metal rails on the backside of the active regions provide flexibility for routing or electrically connecting different components in the integrated circuit. By implementing at least two layers of metal rails on backside of the active regions, integrated circuit can be formed in a smaller area, because a number of contacts and front side metal rails can be reduced. Moreover, the usage of the backside metal rails allows components (e.g., active region, metal over diffusion (MD) region, or gate region) for forming transistors to have more regular or consistent shapes, such that characteristics of the transistors can become more consistent.

Referring to FIGS. 1A-1C, illustrated are top plan views 100A-100C of a layout design including layout patterns to fabricate an integrated circuit, in accordance with one embodiment. In one aspect, the top plan views 100A-100C of a layout design show layout patterns for components in different layers of the integrated circuit. The circuit formed according to the layout design in the top plan views 100A-100C may be an inverter circuit. In one aspect, FIG. 1A shows layout patterns 110A, 110B corresponding to backside power rails. In one aspect, FIG. 1B shows layout patterns 130A, 130B corresponding to active regions of transistors. In one aspect, FIG. 1C shows layout patterns 170A-170E corresponding to front side metal rails (e.g., M0 metal rails). In some embodiments, the layout design shown in top plan views 100A-100C include more, fewer, or different layout patterns than shown in FIGS. 1A-1C. In some embodiments, the layout patterns of the layout design shown in top plan views 100A-100C are arranged in a different manner than shown in FIGS. 1A-1C. According to the layout design shown in top plan views 100A-100C, an integrated circuit can be fabricated or formed.

In FIG. 1B, the layout patterns 120B and 130B indicate a dimension and/or a location of an N-type transistor (e.g., NMOS, N-type FinFET). In one aspect, the layout pattern 120B extending in the Y-direction corresponds to a gate region of the N-type transistor, and the layout pattern 130B extending in the X-direction corresponds to an active region to form a source region and a drain region of the N-type transistor. A gate region is a structure including one or more conductive segments including one or more conductive materials, e.g., polysilicon, one or more metals, and/or one or more other suitable materials, substantially surrounded by one or more insulating materials, e.g., silicon dioxide and/or one or more other suitable materials, the one or more conductive segments thereby being configured to control a voltage provided to underlying and adjacent dielectric layers. A source region or a drain region is a semiconductor structure within an active region, and configured to have a doping type opposite to that of other portions of the active region. The layout patterns 120A, 120C may correspond to gate regions of other transistors. In one aspect, the layout patterns 165B, 165C extending in the Y-direction correspond to MD region to electrically supply to or sink current from the N-type transistor. MD region is a conductive region or a conductive structure directly contacting the source region or the drain region. In some embodiments, the MD region includes one or more of polysilicon, copper (Cu), silver (Ag), tungsten (W), titanium (Ti), nickel (Ni), tin (Sn), aluminum (Al) or another metal or material suitable for providing a low resistance electrical connection between IC structure elements. For example, a gate region of the N-type transistor is formed, at which the layout patterns 120B, 130B intersect with each other; a source region of the N-type transistor is formed, at which the layout patterns 165C, 130B intersect with each other; and a drain region of the N-type transistor is formed, at which the layout patterns 165B, 130B intersect with each other.

In one embodiment, the layout patterns 120B and 130A indicate a dimension and/or location of a P-type transistor (e.g., PMOS or P-type FinFET). In one aspect, the layout pattern 120B extending in the Y-direction corresponds to a gate region of the P-type transistor, and the layout pattern 130A extending in the X-direction corresponds to an active region to form a source region and a drain region of the P-type transistor. In one aspect, the layout patterns 165A, 165B extending in the Y-direction correspond to MD region to electrically supply to or sink current from the P-type transistor. For example, a gate region of the P-type transistor is formed, at which the layout patterns 120B, 130A intersect with each other; a source region of the P-type transistor is formed, at which the layout patterns 165A, 130A intersect with each other; and a drain region of the P-type transistor is formed, at which the layout patterns 165B, 130A intersect with each other. In this configuration, the drain region of the N-type transistor and the drain region of the P-type transistor are coupled to each other and the gate region of the N-type transistor and the gate region of the P-type transistor are coupled to each other to form an inverter.

In one embodiment, the layout patterns 160A-160D indicate dimensions and/or locations of via contacts for electrically contacting backside metal rails underneath the active regions. Through the via contacts formed according to the layout patterns 160A-160D, electrical signals (e.g., voltage or current) can be supplied to or from the transistors. In some embodiments, the via contacts include one or more of copper (Cu), silver (Ag), tungsten (W), titanium (Ti), nickel (Ni), tin (Sn), aluminum (Al) or another metal or material suitable for providing low resistance electrical connections between different layers.

In FIG. 1A, in one embodiment, the layout patterns 140A-140D indicate dimensions and/or locations of backside metal rails. The backside metal rails may include metal or any conductive material. The backside metal rails formed according to the layout patterns 140A-140D may be in M−1 layer, and may be implemented as backside interconnect rails. The backside metal rails may be electrically connected to the transistor (e.g., source region, drain region, or gate region) through via contacts formed according to the layout patterns 160A-160D. In one embodiment, the layout patterns 110A, 110B indicate dimensions and/or locations of backside power rails. The backside power rails may include metal or any conductive material. The backside power rails may be on M−2 layer or a lower layer. The backside power rails formed according to the layout patterns 110A, 110B may be electrically connected to the backside metal rails formed according to the layout patterns 140A-140D through via contacts formed according to layout patterns 150A-150D. The layout patterns 110A, 110B, 140A, 140B, 140C may extend in the X-direction, the Y-direction, or in any direction.

In one configuration, the layout patterns 110A, 110B for the backside power rails can have larger areas with regular structures to provide reliable supply voltages (e.g., VDD, GND). In one example, the backside power rail formed according to the layout pattern 110A can provide a supply voltage (e.g., VDD or 1V) to the source region of the P-type transistor through the backside metal rail formed according to the layout pattern 140A. Similarly, the backside power rail formed according to the layout pattern 110B can provide a supply voltage (e.g., GND or 0V) to the source region of the N-type transistor through the backside metal rail formed according to the layout pattern 140C. Meanwhile, the backside metal rails formed according to the layout patterns 140B, 140D can extend in any direction to electrically couple to other transistors or metal rails for local connections.

In FIG. 1C, in one embodiment, the layout patterns 170A-170E indicate dimensions and/or locations of front side metal rails. In one aspect, the layout patterns 170A-170E extend in the X-direction. The front side metal rails may include metal or any conductive material. The front side metal rails may be on a M0 layer. The front side metal rails may be electrically connected to the transistor (e.g., source region, drain region, or gate region) through via contacts formed according to the layout patterns 175, 180. For example, the metal rail formed according to the layout pattern 170A can be electrically coupled to the drain region of the P-type transistor through the MD region formed according to the layout pattern 165B and the via contact formed according to the layout pattern 175. For example, the metal rail formed according to the layout pattern 170D can be electrically coupled to the common gate region of the N-type transistor and the P-type transistor through the via contact formed according to the layout pattern 180. In some embodiments, the integrated circuit formed according to the layout patterns shown in FIGS. 1A-1C includes additional layers (e.g. M1-M7) for front side metal rails.

In one aspect, the backside power rails and backside interconnect rails as disclosed herein provide several advantages. In one example, the integrated circuit can be formed in a smaller area, because a number of front side metal rails and via contacts can be reduced. For example, by implementing a backside interconnect rails, a gate density can improve by 4% or higher compared to not implementing the backside interconnect rails. Moreover, in one example, MD region or gate region for forming transistors can have more regular or consistent shapes, such that characteristics of the transistors can be more consistent.

Figures 2A, 2B:
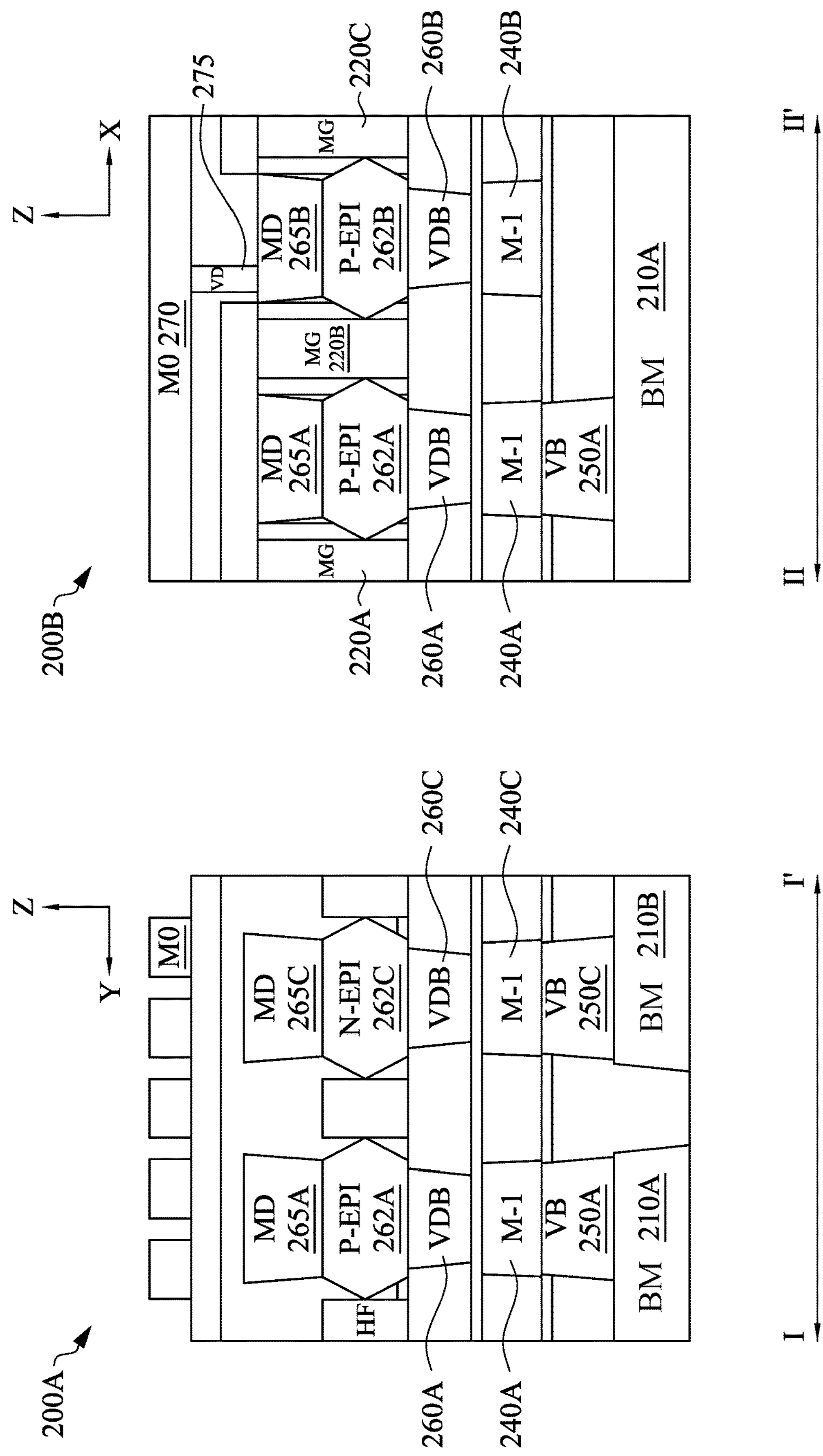
FIG. 2A is a cross-section diagram of the integrated circuit formed according to the layout design of FIGS. 1A-1C along I-I', in accordance with one embodiment.
FIG. 2B is a cross-section diagram of the integrated circuit formed according to the layout design of FIGS. 1A-1C along II-II', in accordance with one embodiment.

FIG. 2A is a cross-section diagram 200A of an integrated circuit formed according to the layout design of FIGS. 1A-1C along I-I', in accordance with one embodiment. FIG. 2B is a cross-section diagram 200B of the integrated circuit formed according to the layout design of FIGS. 1A-1C along II-II' in accordance with one embodiment.

Referring to FIGS. 2A and 2B, an integrated circuit includes a backside power rail layer BM including backside power rails 210A, 210B formed according to the layout patterns 110A, 110B. Above the backside power rail layer BM along the Z-direction, a contact layer VB including via contacts 250A, 250C can be formed according to the layout patterns 150A, 150C. Above the contact layer VB along the Z-direction, a backside metal rail layer M−1 including backside metal rails 240A-240C can be formed according to the layout patterns 140A-140C. Above the backside metal rail layer M−1 along the Z-direction, a contact layer VDB including via contacts 260A-260C can be formed according to the layout patterns 160A-160C. Above the contact layer VDB along the Z-direction, an epitaxial layer EPI including source/drain regions 262A-262C can be formed at intersections of the layout patterns 130A, 130B and the layout patterns 165A-165C. Above the epitaxial layer EPI along the Z-direction, a conductive layer MD including MD regions 265A-265C can be formed according to the layout patterns 165A-165C. Above the conductive layer MD along the Z-direction, a contact layer VD including a via contact 275 can be formed according to the layout pattern 175. Above the contact layer VD along the Z-direction, a front side metal layer M0 including a front side metal rail 270 can be formed according to the layout pattern 170A.

In FIG. 2A, in one aspect, the backside power rail 210A is configured to provide a supply voltage VDD. On the backside power rail 210A along the Z-direction, the via contact 250A is formed. On the VB layer including the via contact 250A along the Z-direction, the backside metal rail 240A is formed. The backside metal rail 240A may be implemented as a backside interconnect rail below (e.g., an opposite direction of the Z-direction) the source region 262A. On the backside metal rail 240A along the Z-direction, the via contact 260A is formed. On the via contact 260A along the Z-direction, the source region 262A of the P-type transistor is formed. On the source region 262A along the Z-direction, the MD region 265A is formed. In one aspect, the MD region 265A is directly coupled to the source region 262A. In some implementation, the MD region 265A can be used as a local interconnect rail to electrically connect nearby components (e.g., metal rails and/or source/drain/gate regions). In one aspect, a side or a surface of the source region 262A facing in the Z-direction is directly coupled to the MD region 265A, and a side or a surface of the source region 262A facing in an opposite direction of the Z-direction is directly coupled to the via contact 260A. In this configuration, the supply voltage VDD can be provided to the source region 262A and the MD region 265A through the via contact 250A, the backside metal rail 240A, and the via contact 260A.

In one aspect, the backside power rail 210B is configured to provide a supply voltage GND. On the backside power rail 210B along the Z-direction, the via contact 250C is formed. On the via contact 250C along the Z-direction, the backside metal rail 240C is formed according to the layout pattern 140C. The backside metal rail 240C may be implemented as a backside interconnect rail. On the backside metal rail 240C along the Z-direction, the via contact 260C is formed. On the via contact 260C along the Z-direction, the source region 262C of the N-type transistor is formed. On the source region 262C along the Z-direction, the MD region 265C is formed. In one aspect, the MD region 265C is directly coupled to the source region 262C. In some implementation, the MD region 265C can be used as a local interconnect rail to electrically connect nearby components (e.g., metal rails and/or source/drain/gate regions).

In FIG. 2B, the integrated circuit includes gate regions 220A-220C formed according to the layout patterns 120A-120C. In one aspect, the gate region 220B is formed between the source/drain regions 262A, 262B and between the MD regions 265A, 265B. On the backside metal rail 240B along the Z-direction, the via contact 260B is formed. On the via contact 260B along the Z-direction, the drain region 262B is formed. On the drain region 262B of the P-type transistor along the Z-direction, the MD region 265B is formed. Hence, the drain region 262B is disposed between the via contact 260B and the MD region 265B. In particular, a side or a surface of the drain region 262B facing in the Z-direction is directly coupled to the MD region 265B, and a side or a surface of the drain region 262B facing in an opposite direction of the Z-direction is directly coupled to the via contact 260B. On the MD region 265B along the Z-direction, a via contact 275 is formed according to the layout pattern 175. On the via contact 275 along the Z-direction, the front side metal rail 270 is formed.

In this configuration, the source region 262A is electrically coupled to the backside power rail 210A for supply voltage VDD through the via contact 250A, the backside metal rail 240A, and the via contact 260A. Accordingly, the supply voltage VDD can be provided to the transistors through the backside power rail 210A and backside metal rail 240A. In addition, the drain region 262B is electrically coupled to the front side metal rail 270 through the via contact 275 and the MD region 265B, and is electrically coupled to the backside metal rail 240B through the via contact 260B. Hence, electrical signals can be provided through the front side metal rail 270, through the backside metal rail 240B, or both.

Figure 3A:
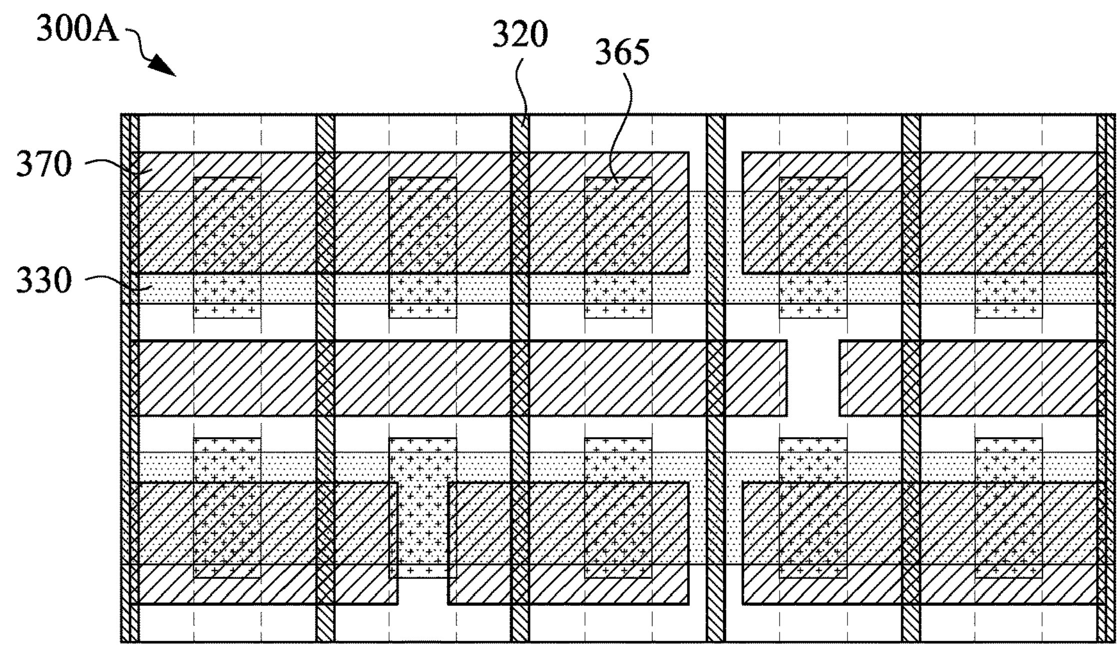
FIGS. 3A and 3B are top plan views of a layout design of an integrated circuit including backside metal rails, in accordance with one embodiment.
Figure 3B:
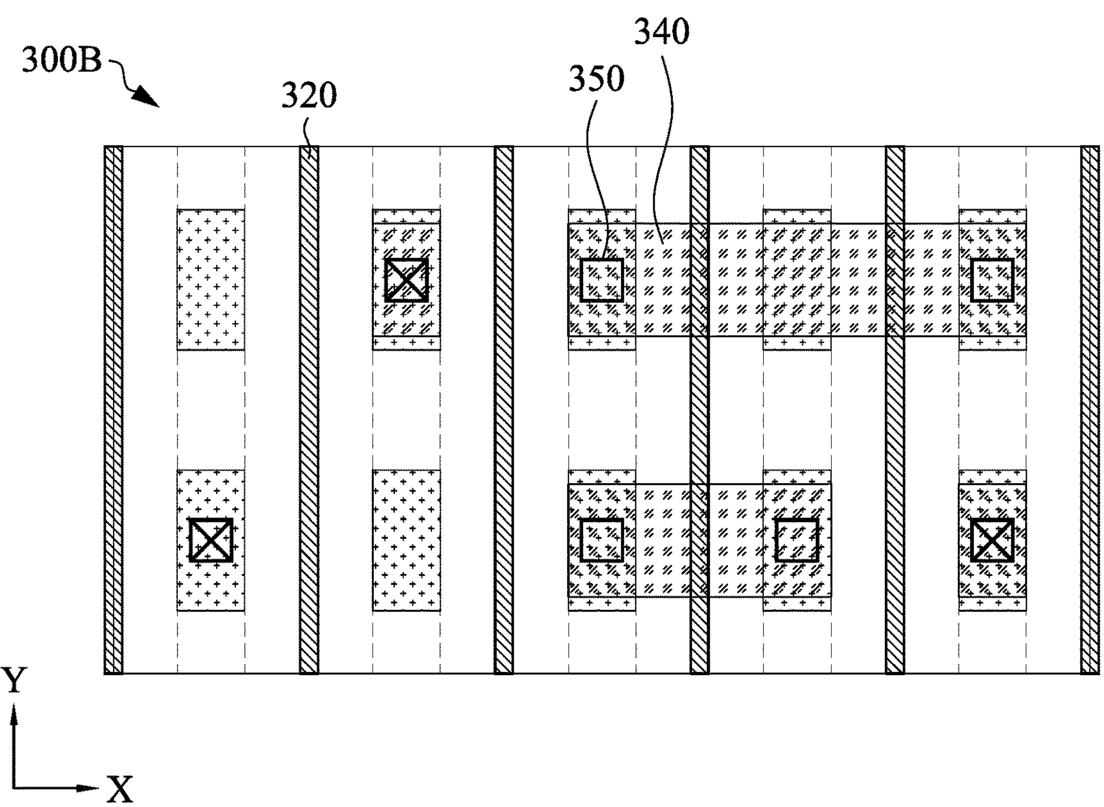

FIGS. 3A and 3B are top plan views 300A, 300B of a layout design of an integrated circuit including backside metal rails, in accordance with one embodiment. In one aspect, the top plan views 300A 300B of a layout design show layout patterns for components in different layers of the integrated circuit. In one aspect, the top plan view 300A shows layout patterns of front side metal rails of the integrated circuit, and the top plan view 300B shows layout patterns of backside metal rails of the integrated circuit. In FIG. 3A, the layout pattern 320 extending in the Y-direction indicates a dimension and/or a location of a gate region of a transistor, the layout pattern 330 extending in the X-direction indicates a dimension and/or a location of active region, the layout pattern 365 extending in the Y-direction indicates a dimension and/or a location of MD region, and the layout pattern 370 extending in the X-direction indicates a dimension and/or a location of a front side metal rail (e.g., M0 rail). In FIG. 3B, a layout pattern 340 extending in the X-direction indicates a dimension and/or a location of a backside metal rail (e.g., in the M−1 layer), and the layout pattern 350 indicates a dimension and/or a location of a via contact between the transistor and the backside interconnect (e.g., in the VDB layer). The backside metal rails may be formed in a layer (e.g., the M−1 layer) between a first layer (e.g., the epitaxial layer EPI), in which the transistors are formed, and a second layer, in which the backside power rails (e.g., the BM layer) are formed, as shown in FIGS. 2A and 2B. In other embodiments, the layout design of the integrated circuit shown in the top plan views 300A, 300B may include more or fewer layout patterns for different layers.

In one aspect, the backside metal rails and backside power rails allow components of transistors to be formed in a regular or consistent structure. For example, supply voltages can be provided from backside power rails underneath, thus ends or edges of the layout patterns 365 for MD regions can be aligned with similar shapes without extending to connect to front side power rails. Moreover, characteristics of transistors can become more consistent compared to MD regions having irregular or inconsistent structures. In addition, backside metal rails allow a reduction in a number of front side metal rails and via connections, such that an area of the integrated circuit can be reduced.

Figure 4A:
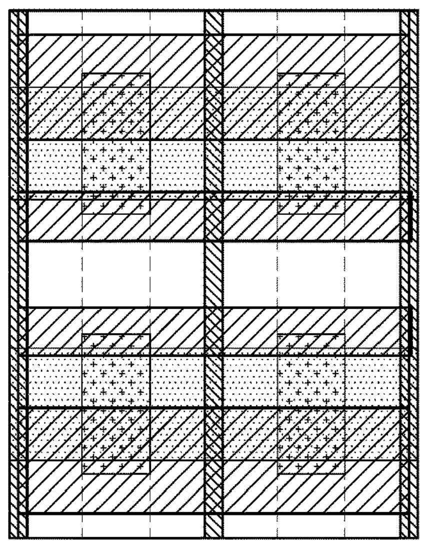
FIGS. 4A and 4B are top plan views of a layout design of an integrated circuit including backside metal rails, in accordance with one embodiment.
Figure 4B:
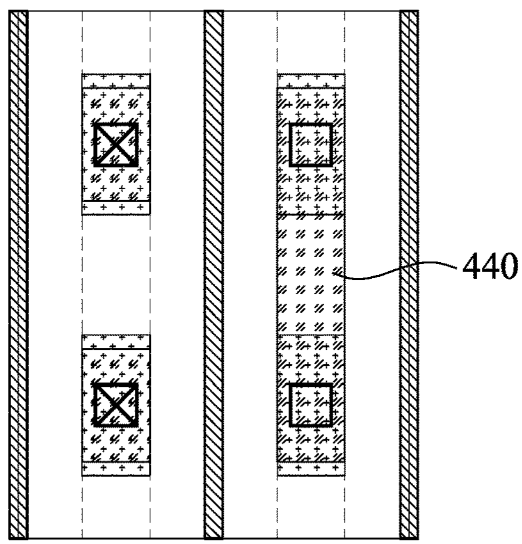

FIGS. 4A and 4B are top plan views 400A, 400B of a layout design of an integrated circuit including backside metal rails, in accordance with one embodiment. In one aspect, the top plan views 400A, 400B of a layout design show layout patterns for components in different layers of the integrated circuit. In one aspect, the top plan view 400A shows layout patterns of front side metal rails (e.g., in one or more of the MD layer, M0 layer) of the integrated circuit, and the top plan view 400B shows layout patterns of backside metal rails (e.g., in the M−1 layer) of the integrated circuit. In one aspect, the layout design shown in FIGS. 4A, 4B is similar to the layout design shown in FIGS. 3A-3B, except the top plan view 400B includes a layout pattern 440 extending in the Y-direction that indicates a dimension and/or a location of a backside metal rail. Thus, detailed description of duplicated portion thereof is omitted herein for the sake of brevity. In one aspect, the backside metal rail extending in the Y-direction helps provide flexibility in terms of routing or local interconnect. In other embodiments, the layout design of the integrated circuit shown in the top plan views 400A, 400B may include more or fewer layout patterns for different layers.

Figure 5A:
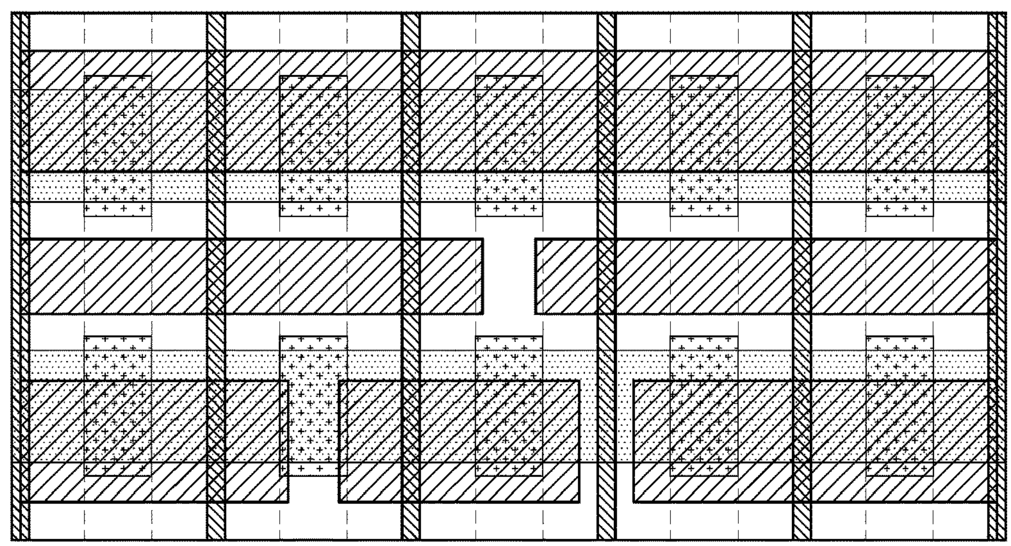
FIGS. 5A and 5B are top plan views of a layout design of an integrated circuit including backside metal rails, in accordance with one embodiment.
Figure 5B:
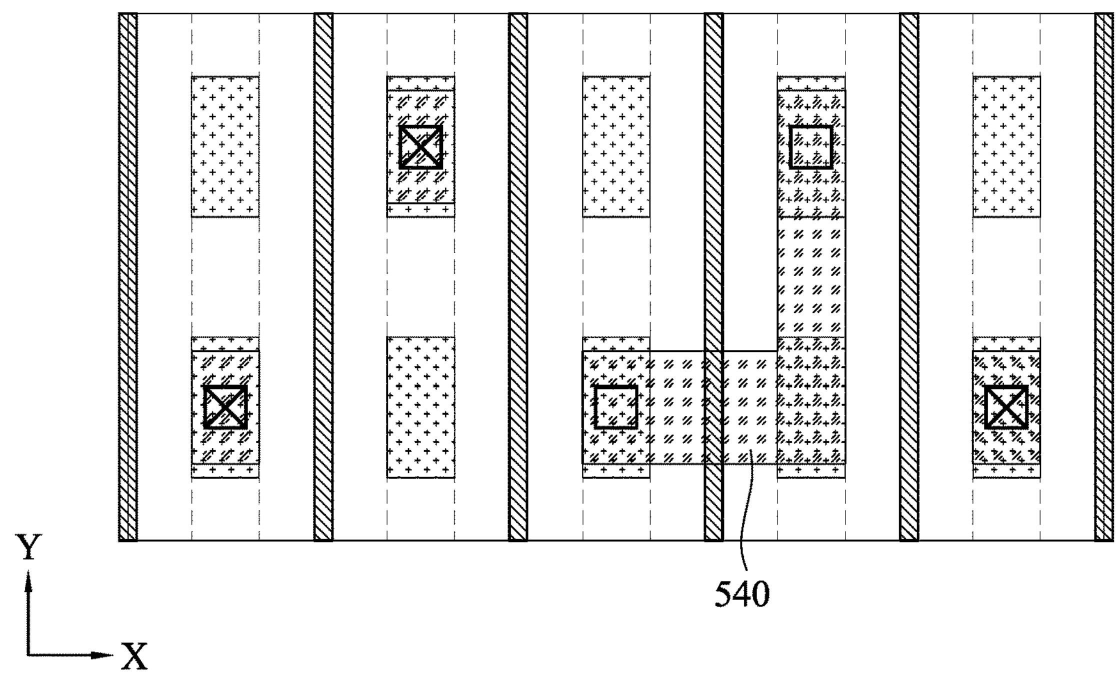

FIGS. 5A and 5B are top plan views 500A, 500B of a layout design of an integrated circuit including backside metal rails (e.g., in the M−1 layer), in accordance with one embodiment. In one aspect, the top plan views 500A, 500B of a layout design show layout patterns for components in different layers of the integrated circuit. In one aspect, the top plan view 500A shows layout patterns of front side metal rails of the integrated circuit, and the top plan view 500B shows layout patterns of backside metal rails of the integrated circuit. In one aspect, the layout design shown in FIGS. 5A, 5B is similar to the layout design shown in FIGS. 3A-3B, except the top plan view 500B includes a layout pattern 540 extending in the X-direction and the Y-direction that indicates a dimension and/or a location of a backside metal rail. Thus, detailed description of duplicated portion thereof is omitted herein for the sake of brevity. In one aspect, the backside metal rail extending in the X-direction and the Y-direction help provide flexibility in terms of routing or local interconnect. In other embodiments, the layout design of the integrated circuit shown in the top plan views 500A, 500B may include more or fewer layout patterns for different layers.

Figure 6A:
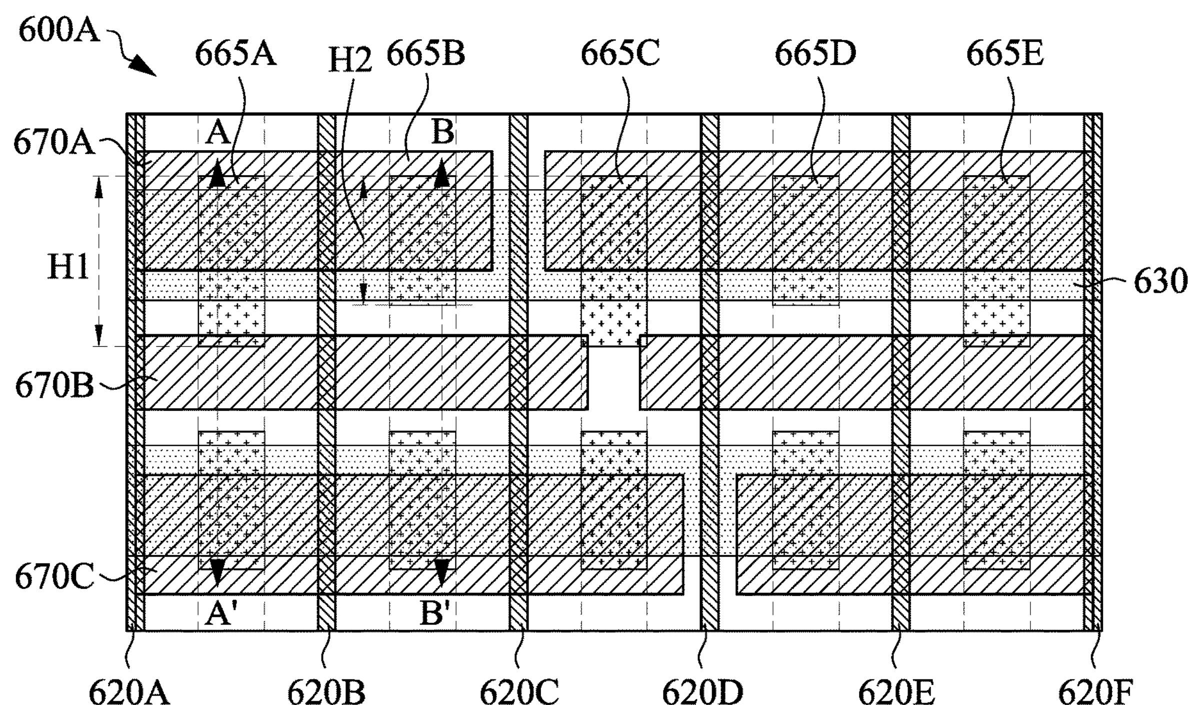
FIGS. 6A and 6B are top plan views of a layout design of an integrated circuit including backside metal rails, in accordance with one embodiment.
Figure 6B:
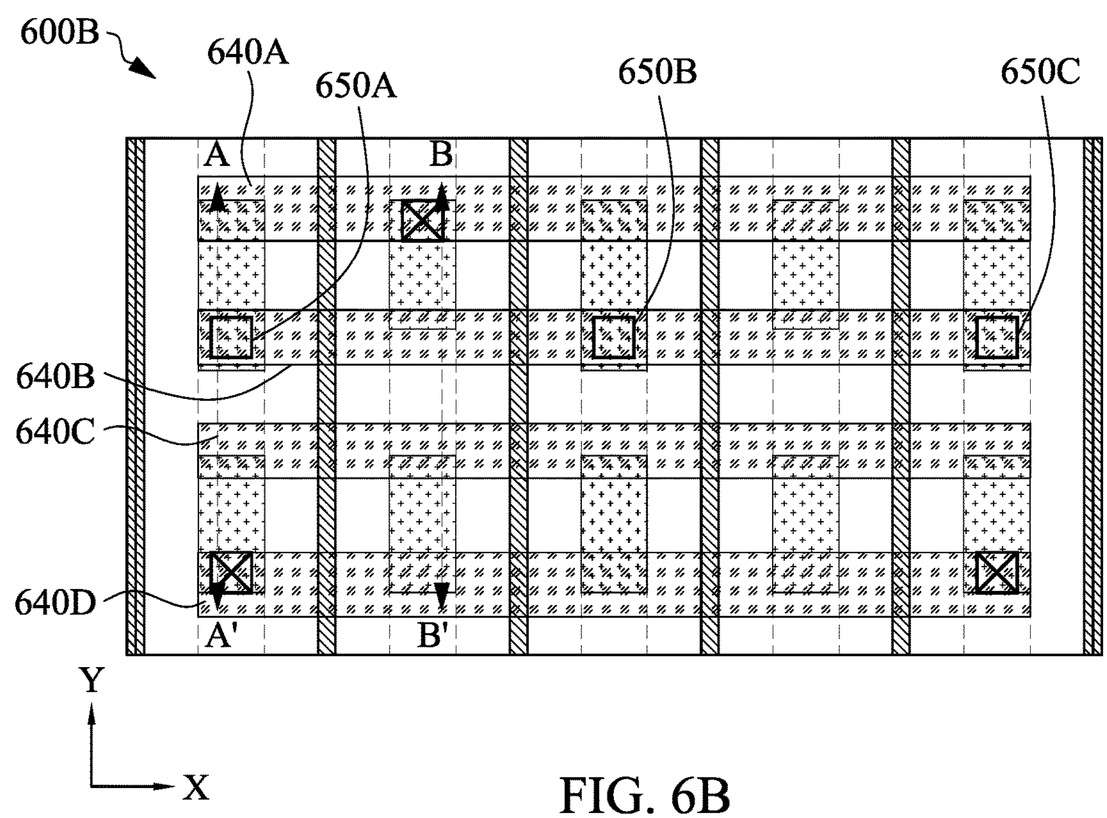

FIGS. 6A and 6B are top plan views 600A, 600B of a layout design of an integrated circuit including backside metal rails (e.g., in the M−1 layer), in accordance with one embodiment. In one aspect, the top plan views 600A, 600B of a layout design show layout patterns for components in different layers of the integrated circuit. In one aspect, the top plan view 600A shows layout patterns of front side metal rails of the integrated circuit, and the top plan view 600B shows layout patterns of backside metal rails of the integrated circuit. In FIG. 6A, the layout patterns 620A-620F extending in the Y-direction indicate dimensions and/or locations of gate regions of transistors, the layout pattern 630 extending in the X-direction indicates a dimension and/or a location of an active region, the layout patterns 665A-665E extending in the Y-direction indicate dimensions and/or locations of MD regions, and the layout patterns 670A-670C extending in the X-direction indicate dimensions and/or locations of front side metal rails (e.g., M0 rail).

In FIG. 6B, layout patterns 640A-640D extending in the X-direction indicate dimensions and/or locations of backside metal rails, and the layout patterns 650A-650C indicate dimensions and/or locations of via contacts between the transistors and the backside metal rail (e.g., M−1 rail). In one aspect, within an area corresponding to a cell, the layout design includes three layout patterns 670A-670C for the front side metal rails (e.g., M0 rail) and four layout patterns 640A-640D for the backside metal rails (e.g., M−1 rail). In other embodiments, the layout design of the integrated circuit shown in the top plan views 600A, 600B may include more or fewer layout patterns for different layers.

In some embodiments, source/drain regions and MD regions with different heights can be formed in an interleaving sequence according to the layout patterns 665A-665E. For example, source/drain regions and MD regions with a first height H1 can be formed according to the layout patterns 665A, 665C, 665E, where source/drain regions and MD regions with a second height H2 less than the first height H1 can be formed according to the layout patterns 665B, 665D. In one aspect, source/drain regions and MD regions formed according to the layout patterns 665A, 665C, 665E can be electrically connected through via contacts formed according to the layout patterns 650A-650C and a backside metal rail formed according to the layout pattern 640B. Such local connection through the backside metal rails can help flexibility of locations and dimensions of front side metal rails (e.g., M0 rails) formed according to the layout patterns 670A-670C. For example, a front side metal rail can be formed according to the layout pattern 670B such that the front side metal rail can be close to an edge of the MD region or partially overlap the MD region. By implementing backside metal rails and backside power rails, a fewer number of front side metal rails can be implemented to connect to the transistors. Hence, an integrated circuit can be formed with less area by implementing backside metal rails.

Figure 6C:
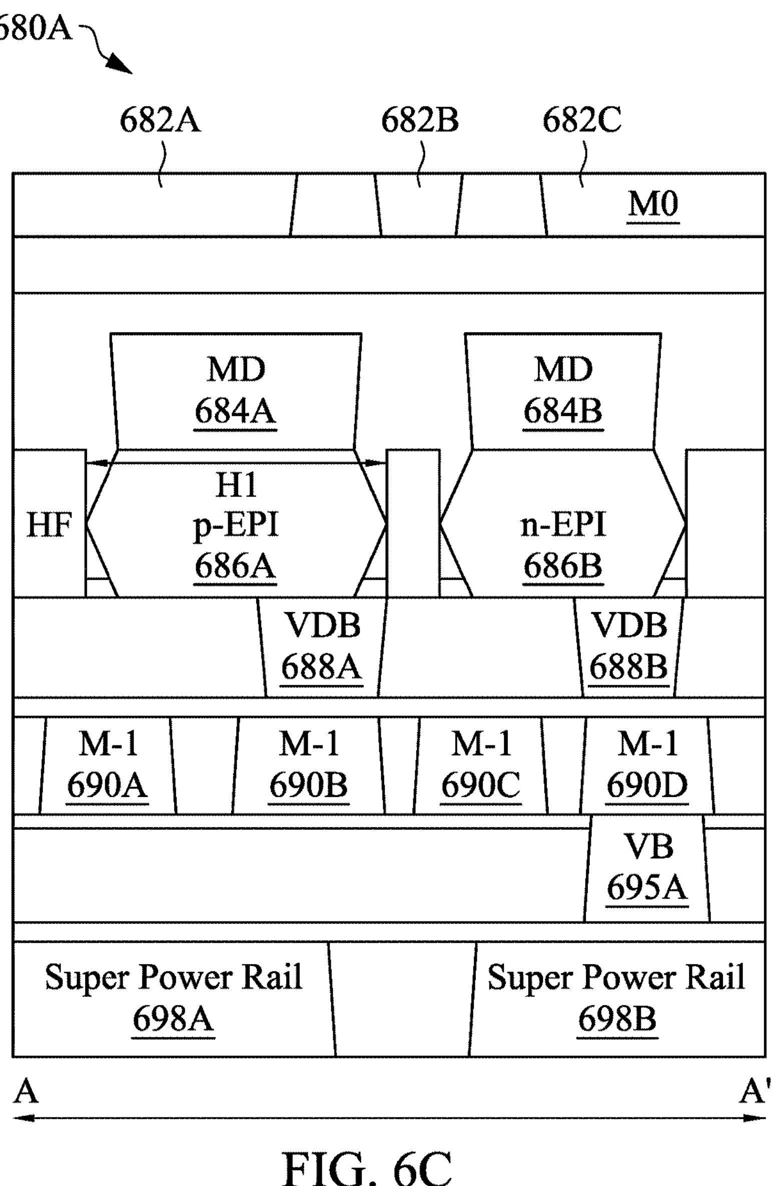
FIG. 6C is a cross-section diagram of the integrated circuit formed according to the layout design of FIGS. 6A and 6B along A-A', in accordance with one embodiment.
Figure 6D:
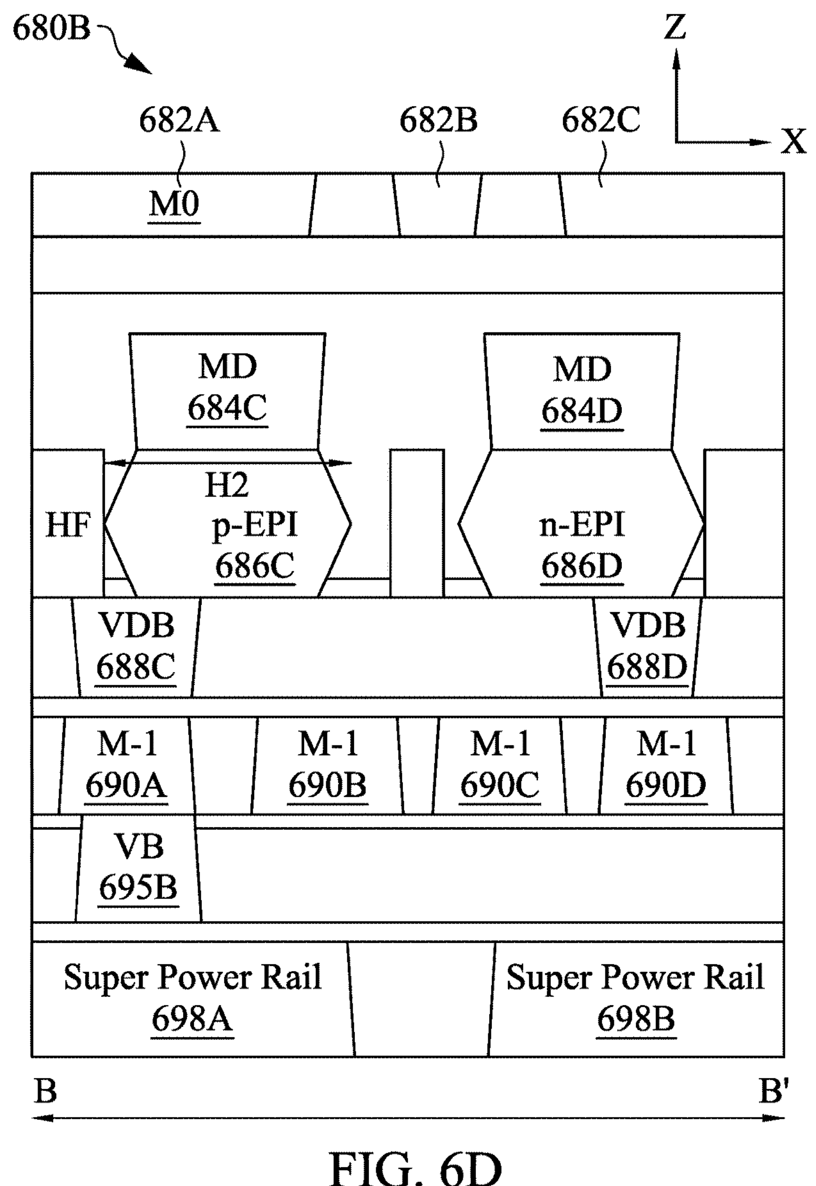
FIG. 6D is a cross-section diagram of the integrated circuit formed according to the layout design of FIGS. 6A and 6B along B-B', in accordance with one embodiment.

FIG. 6C is a cross-section diagram 680A along A-A' of the integrated circuit formed according to the layout design of FIGS. 6A and 6B, in accordance with one embodiment. FIG. 6D is a cross-section diagram 680B along B-B' of the integrated circuit formed according to the layout design of FIGS. 6A and 6B, in accordance with one embodiment.

Referring to FIGS. 6C and 6D, an integrated circuit includes a backside power rail layer BM including backside power rails 698A, 698B for providing supply voltages VDD, GND, respectively. Above the backside power rail layer BM along the Z-direction, a contact layer VB including via contacts 695A, 695B can be formed. Above the contact layer VB along the Z-direction, a backside metal rail layer M−1 including four backside metal rails 690A-690D can be formed according to the layout patterns 640A-640D, respectively. In one aspect, the backside metal rails 690A is used for providing a supply voltage VDD and the backside metal rails 690D is used for providing a ground voltage GND, where the backside metal rails 690B, 690C are used for local interconnect. Above the backside metal rail layer M−1 along the Z-direction, a contact layer VDB including via contacts 688A-688D can be formed. For example, the via contact 688A can be formed according to the layout pattern 650A. Above the contact layer VDB along the Z-direction, an epitaxial layer EPI including source/drain regions 686A-686D can be formed. For example, the drain structure 686A of a P-type transistor can be formed at an intersection of the layout pattern 665A and the layout pattern 630, and the source region 686C of the P-type transistor can be formed at an intersection of the layout pattern 665B and the layout pattern 630. Above the epitaxial layer EPI along the Z-direction, a conductive layer MD including MD regions 684A-684D can be formed. For example, the MD regions 684A, 684C can be formed according to the layout patterns 665A, 665B. Above the conductive layer MD along the Z-direction, a contact layer VD can be formed. Above the contact layer VD along the Z-direction, a front side metal layer M0 including three front side metal rails 682A-682C can be formed according to the layout patterns 670A-670C, respectively.

In FIG. 6C, the backside power rail 698B is configured to provide a supply voltage GND. On the backside power rail 698B along the Z-direction, the via contact 695A is formed. On the via contact 695A along the Z-direction, the backside metal rail 690D is formed. The backside metal rail 690D may be implemented as a backside interconnect rail. On the backside metal rail 690D along the Z-direction, the via contact 688B is formed. On the via contact 688B along the Z-direction, the source region 686B of the N-type transistor is formed. On the source region 686B along the Z-direction, the MD region 684B is formed. In one aspect, the MD region 684B is directly coupled to the source region 686B. In one aspect, a side or a surface of the source region 686B facing in the Z-direction is directly coupled to the MD region 684B, and a side or a surface of the source region 686B facing in an opposite direction of the Z-direction is directly coupled to the via contact 688B. In this configuration, the supply voltage GND can be provided to the source region 686B and the MD region 684B through the via contact 695A, the backside power rail 690D, and the via contact 688B.

In FIG. 6D, in one aspect, the backside power rail 698A is configured to provide a supply voltage VDD. On the backside power rail 698A along the Z-direction, the via contact 695B is formed. On the VB layer including the via contact 695B along the Z-direction, the backside metal rail 690A is formed. The backside metal rail 690A may be implemented as a backside interconnect rail below (e.g., an opposite direction of the Z-direction) the source region 686C. On the backside metal rail 690A along the Z-direction, the via contact 688C is formed. On the via contact 688C along the Z-direction, the source region 686C of the P-type transistor is formed. On the source region 686C along the Z-direction, the MD region 684C is formed. In one aspect, the MD region 684C is directly coupled to the source region 686C. In one aspect, a side or a surface of the source region 686C facing in the Z-direction is directly coupled to the MD region 684C, and a side or a surface of the source region 686C facing in an opposite direction of the Z-direction is directly coupled to the via contact 688C. In this configuration, the supply voltage VDD can be provided to the source region 686C and the MD region 684C through the via contact 695B, the backside power rail 690A, and the via contact 688C.

Figure 7:
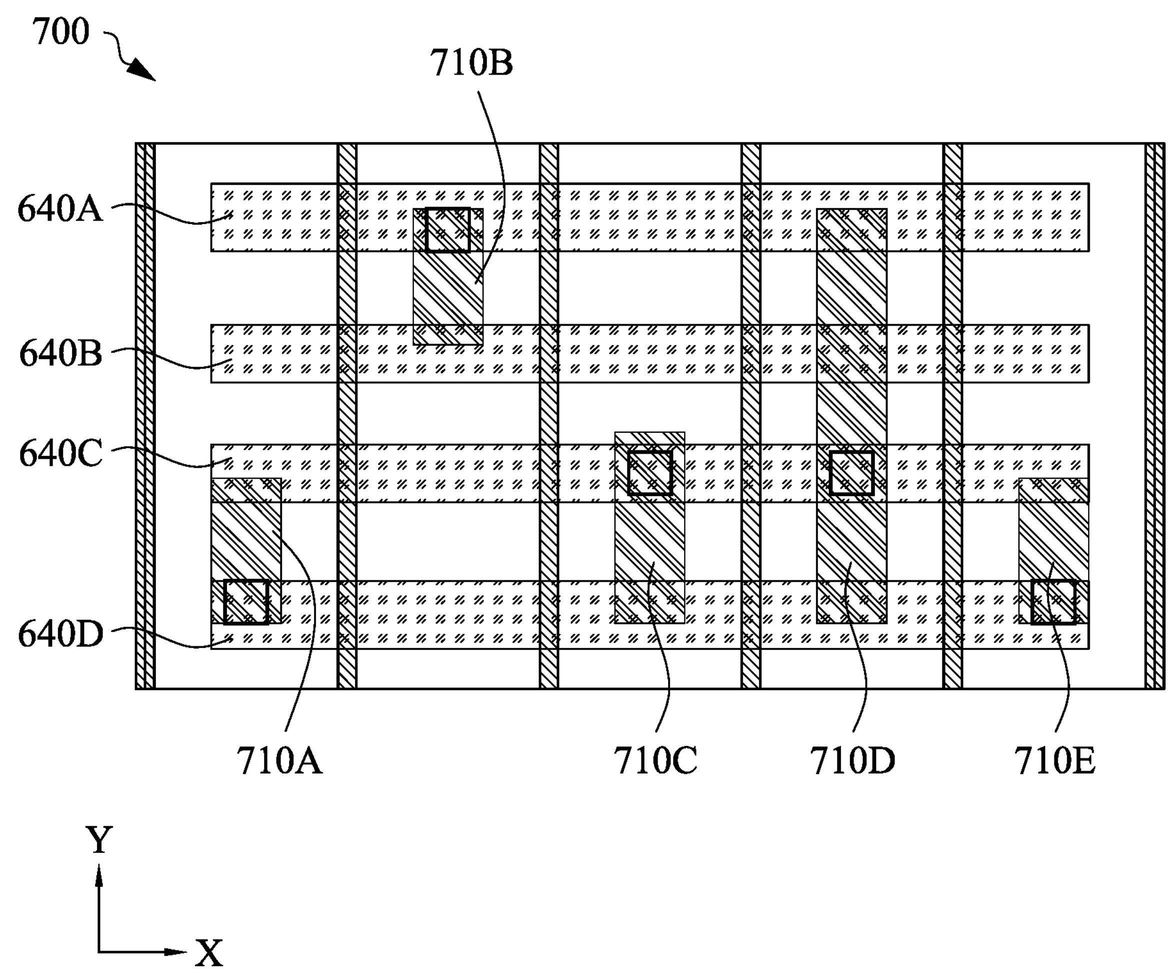
FIG. 7 is a top plan view of a layout design of an integrated circuit including backside metal rails, in accordance with one embodiment.

FIG. 7 is a top plan view 700 of a layout design of an integrated circuit including backside metal rails, in accordance with one embodiment. In one aspect, the top plan view 700 shows layout patterns 710A-710E of backside metal rails of the integrated circuit. The backside metal rails formed according to the layout patterns may be in M−2 layer, and disposed between a first layer (e.g., M−1 layer), in which the backside metal rails are formed, and a second layer (e.g., BM layer), in which backside power rails are formed. The backside metal rails formed according to the layout patterns 710A-710E may include metal or any conductive materials. As shown in FIG. 7, in some embodiments, layout patterns 640A-640D for backside metal rails in M−1 layer may extend in the X-direction, while layout patterns 710A-710E for backside metal rails in M−2 layer may extend in the Y-direction. In some embodiments, one or more via contacts can be formed where the layout pattern for a backside metal rail in M−1 layer and the layout pattern for a backside metal rail in M−2 layer intersect to allow the backside metal rails in different layers to be electrically coupled with each other. Although not shown for simplicity, one or more via contacts can be formed, where the layout pattern for a backside metal rail in M−2 layer and the layout pattern for a backside power rail intersect, to allow the backside metal rail in the M−2 layer and the backside power rail to be electrically coupled with each other. Employing the backside metal rails in M−2 layer between the backside metal rails in M−1 layer and a backside power rail in the BM layer provides further flexibility in placement and routing, and allows an integrated circuit to be designed in a compact form.

Figure 8A:
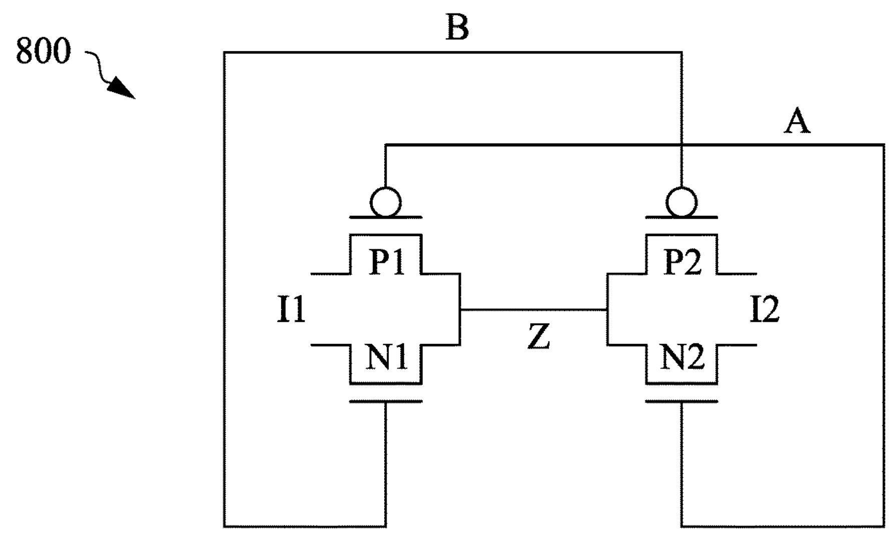
FIG. 8A is a schematic diagram of an example multiplexer circuit, in accordance with one embodiment.

FIG. 8A is a schematic diagram of an example multiplexer circuit 800, in accordance with one embodiment. In one configuration, the multiplexer circuit 800 includes P-type transistors P1, P2 (e.g., PMOS transistors or P-type FinFET) and N-type transistors N1, N2 (e.g., NMOS transistors or N-type FinFET). In one configuration, a first input port I1 of the multiplexer circuit 800 is coupled to a drain region (or a source region) of the transistor P1, and a drain region (or a source region) of the transistor N2. Similarly, a second input port 12 of the multiplexer circuit 800 is coupled to a drain region (or a source region) of the transistor P2, and a drain region (or a source region) of the transistor N2. In addition, an output port Z of the multiplexer circuit 800 is coupled to a source region (or a drain region) of the transistor P1, a source region (or a drain region) of the transistor P2, a source region (or a drain region) of the transistor N1, and a source region (or a drain region) of the transistor N2. Moreover, a control port A of the multiplexer circuit 800 is coupled to a gate region of the transistor P1 and a gate region of the transistor N2, and a control port B of the multiplexer circuit 800 is coupled to a gate region of the transistor P2 and a gate region of the transistor N1. In this configuration, when a voltage at the control port A is high (e.g., VDD) and a voltage at the control port B is low (e.g., GND), then an electrical signal at the input port 12 can be passed to the output port Z through the transistors P2, N2. Similarly, when a voltage at the control port A is low (e.g., GND) and a voltage at the control port B is high (e.g., VDD), then an electrical signal at the input port I1 can be passed to the output port Z through the transistors P1, N1.

Figure 8B:
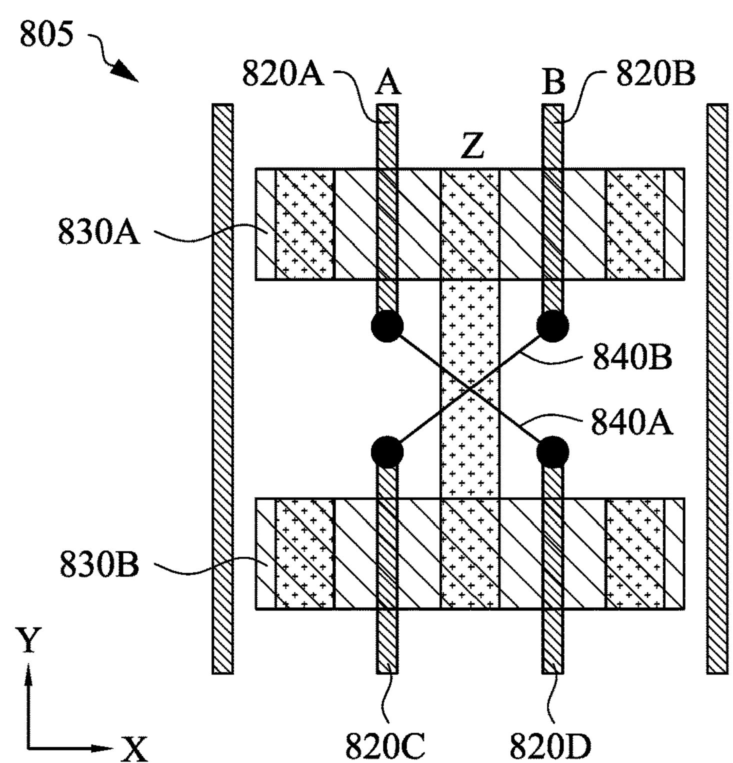
FIG. 8B is a top plan view of a layout design of the example multiplexer circuit of FIG. 8A, in accordance with one embodiment.

FIG. 8B is a top plan view 805 of a layout design of the example multiplexer circuit 800 of FIG. 8A, in accordance with one embodiment. In one aspect, the layout design shown in FIG. 8B includes layout patterns 830A, 830B that indicate dimensions and/or locations of active regions, and layout patterns 820A-820D that indicate dimensions and/or locations of gate regions. As described above with respect to FIG. 1B, transistors can be formed where layout patterns 830A, 830B for the active regions and the layout patterns 820A-820D for the gate regions intersect. In one example, gate regions formed according to the layout patterns 820A, 820D can be assigned to or coupled to the control port A of the multiplexer circuit 800, and gate regions formed according to the layout patterns 820B, 820C can be assigned to or coupled to the control port B of the multiplexer circuit 800. To implement the multiplexer circuit 800 as shown in FIG. 8A, cross coupled connections 840A, 840B may be employed. In one aspect, the backside metal rails can be used to allow local interconnect as described below with respect to FIGS. 9A-9C, 10A-10C, 11A-11C, and 12A-12B.

Figure 9A:
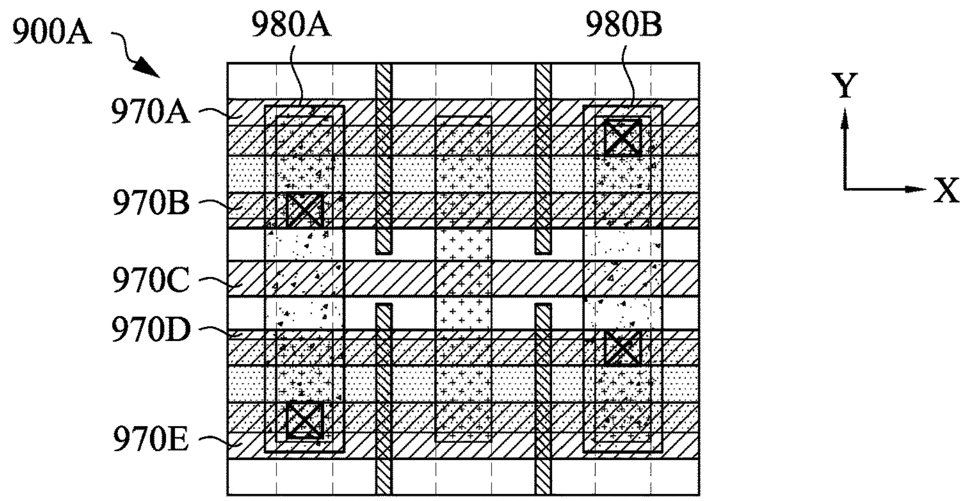
FIGS. 9A-9C are top plan views of a layout design of the example multiplexer circuit of FIG. 8A including backside metal rails, in accordance with one embodiment.
Figure 9B:
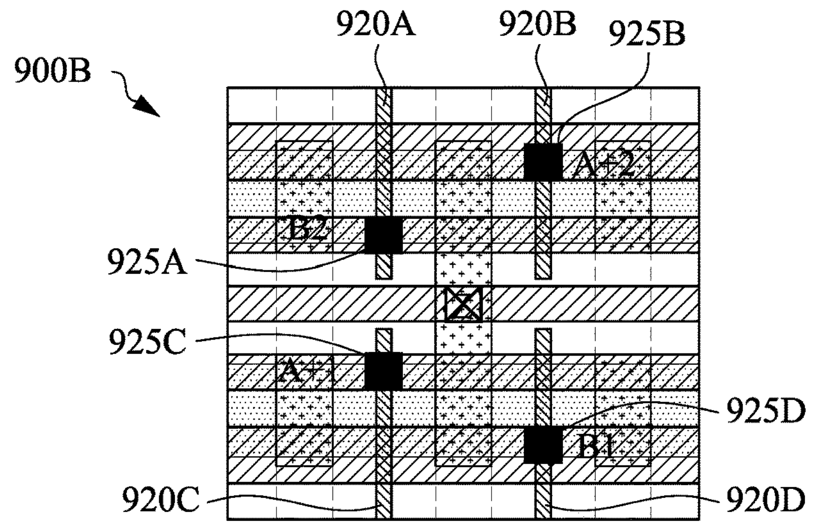
Figure 9C:
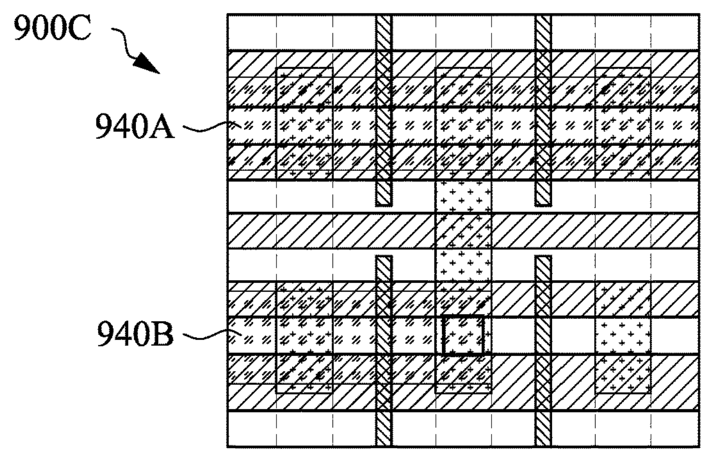

FIGS. 9A-9C are top plan views 900A-900C of layout designs of the example multiplexer circuit 800 of FIG. 8A including backside metal rails (e.g., in M−1 layer), in accordance with one embodiment. In one aspect, the top plan views 900A-900C of a layout design show layout patterns for components in different layers of the integrated circuit. In one aspect, a layout design 900A shown in FIG. 9A includes layout patterns 970A-970E extending the X-direction, and layout patterns 980A-980B extending in the Y-direction. The layout patterns 970A-970E may indicate dimensions and locations of front side metal rails (e.g., M0 rails), and the layout patterns 980A, 980B may indicate dimensions and locations of front side metal rails (e.g., M1 rails). In one aspect, a layout design 900B shown in FIG. 9B includes layout patterns 920A-920D extending the Y-direction, and layout patterns 925A-925D. The layout patterns 920A-920D may indicate dimensions and locations of gate regions, and the layout patterns 925A-925D may indicate dimensions and locations of via contacts between the gate regions and the front side metal rails (e.g., M0 rails). In one aspect, a layout design 900C shown in FIG. 9C includes layout patterns 940A-940B extending the X-direction. The layout patterns 940A, 940B may indicate dimensions and locations of backside metal rails (e.g., M−1 layer). According to the layout design shown FIGS. 9A-9C, cross-coupled connections 840A, 840B can be formed through the front side metal rails (e.g., M1 rails and M0 rails). Moreover, drain regions or source regions of transistors can be locally routed through the backside metal rails (e.g., the M−1 rails).

Figure 10A:
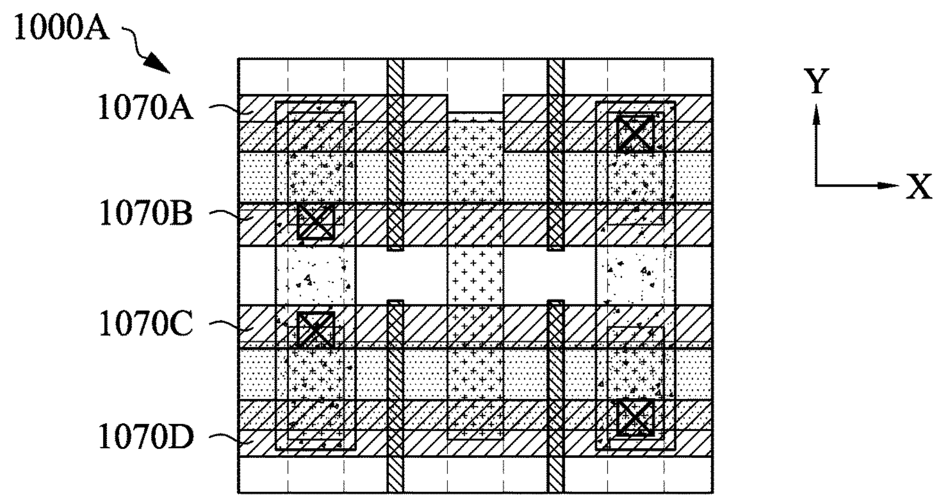
FIGS. 10A-10C are top plan views of a layout design of the example multiplexer circuit of FIG. 8A including backside metal rails, in accordance with one embodiment.
Figure 10B:
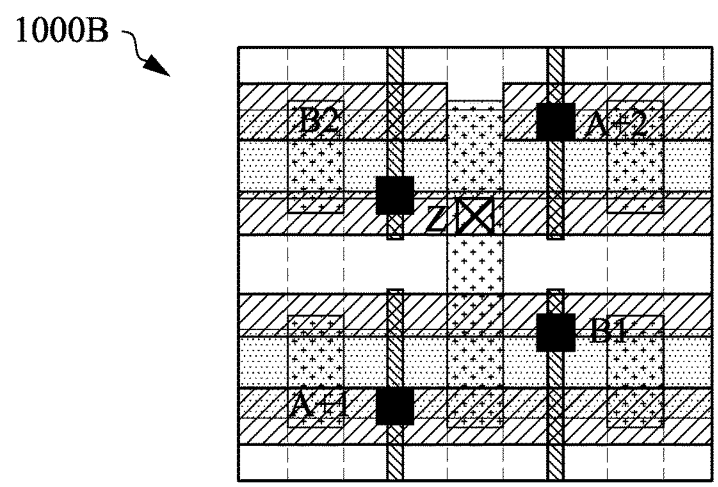
Figure 10C:
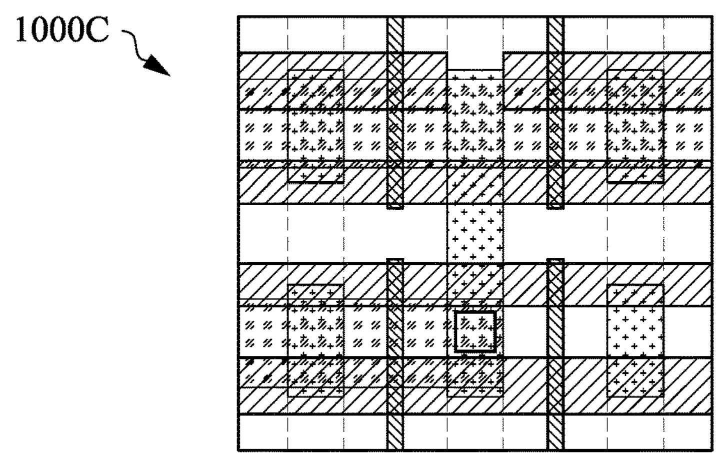

FIGS. 10A-10C are top plan views 1000A-1000C of a layout design of the example multiplexer circuit 800 of FIG. 8A including backside metal rails (e.g., in M−1 layer), in accordance with one embodiment. In one aspect, the top plan views 1000A-1000C of a layout design show layout patterns for components in different layers of the integrated circuit. In one aspect, the layout design shown in the top plan views 1000A-1000C are similar to the layout design in the top plan views 900A-900C shown in FIGS. 9A-9C, except the layout design shown in FIGS. 10A-10C includes layout patterns 1070A-1070D for four front side metal rails (e.g., M0 rails) instead of five front side metal rails. According to the layout design shown FIGS. 10A-10C, cross-coupled connections 840A, 840B can be formed through the front side metal rails (e.g., M1 rails and M0 rails). Moreover, drain regions or source regions of transistors can be locally routed through the backside metal rails (e.g., the M−1 rails).

Figure 11A:
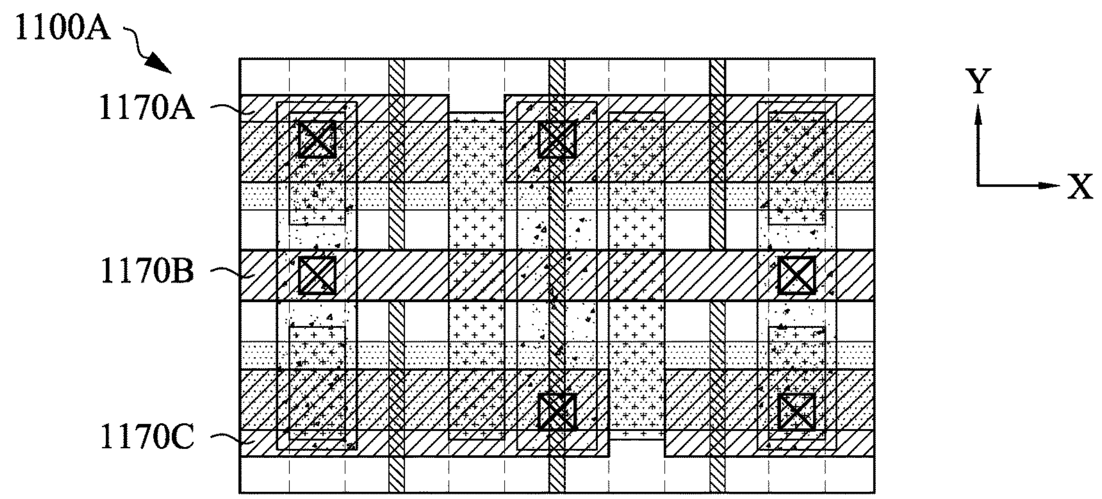
FIGS. 11A-11C are top plan views of a layout design of the example multiplexer circuit of FIG. 8A including backside metal rails, in accordance with one embodiment.
Figure 11B:
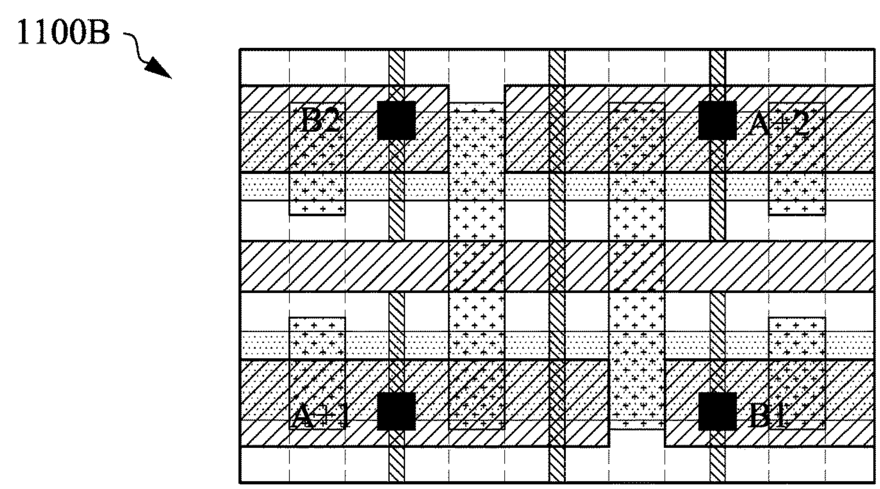
Figure 11C:
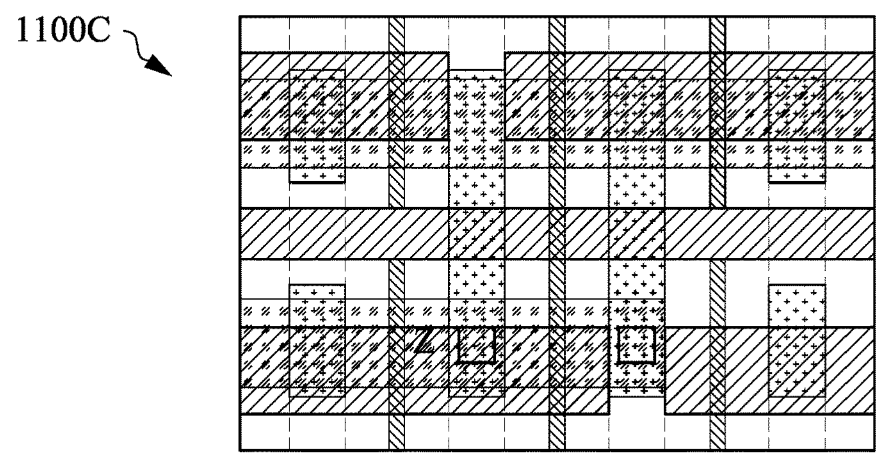

FIGS. 11A-11C are top plan views of a layout design of the example multiplexer circuit 800 of FIG. 8A including backside metal rails (e.g., in M−1 layer), in accordance with one embodiment. In one aspect, the top plan views 1100A-1100C of a layout design show layout patterns for components in different layers of the integrated circuit. In one aspect, the layout design shown in the top plan views 1100A-1100C are similar to the layout design in the top plan views 900A-900C shown in FIGS. 9A-9C, except the layout design shown in FIGS. 11A-11C includes layout patterns 1170A-1170C for three front side metal rails (e.g., M0 rails) instead of five front side metal rails. According to the layout design shown FIGS. 11A-11C, cross-coupled connections 840A, 840B can be formed through the front side metal rails (e.g., M1 rails and M0 rails). Moreover, drain regions or source regions of transistors can be locally routed through the backside metal rails (e.g., the M−1 rails).

Figure 12B:
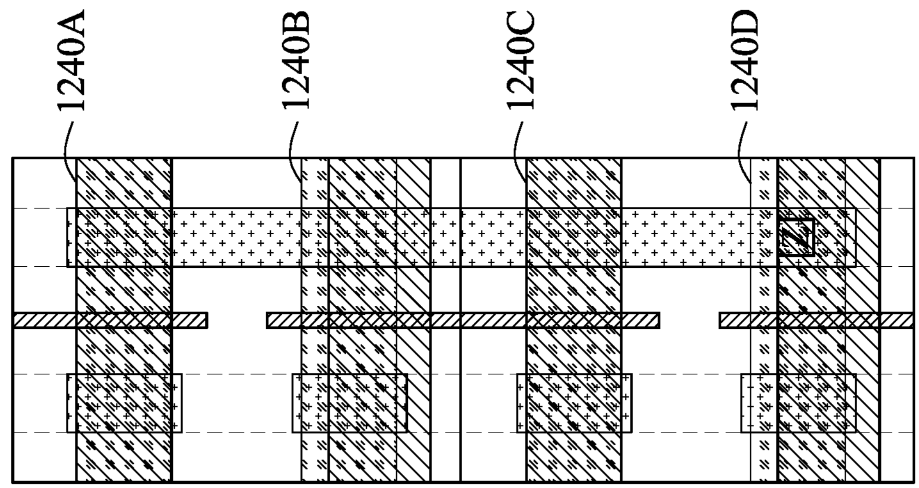
FIGS. 12A and 12B are top plan views of a layout design of the example multiplexer circuit of FIG. 8A including backside metal rails, in accordance with one embodiment.
Figure 12A:
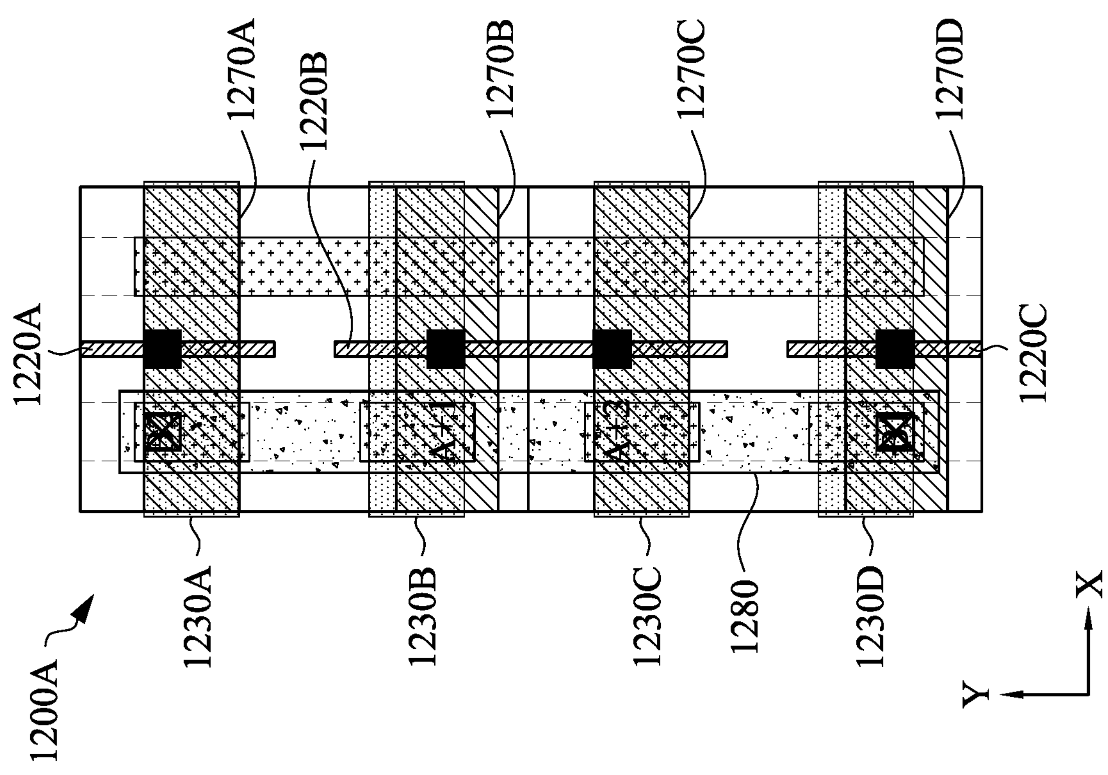

FIGS. 12A and 12B are top plan views 1200A-1200B of a layout design of the example multiplexer circuit 800 of FIG. 8A including backside metal rails (e.g., in M−1 layer), in accordance with one embodiment. In one aspect, the top plan views 1200A-1200B of a layout design show layout patterns for components in different layers of the integrated circuit. In one aspect, the layout design shown in FIG. 12A includes layout patterns 1230A-1230D that indicate dimensions and/or locations of active regions, and layout patterns 1220A-1220C that indicate dimensions and/or locations of gate regions. As described above with respect to FIG. 1B, transistors can be formed where layout patterns 1230A-1230D for the active regions and the layout patterns 1220A-1220C for the gate regions intersect. In one example, different transistors are formed along the Y-direction according to the layout patterns 1220A-1220C, and 1230A-1230B.

In one aspect, front side metal rails and backside metal rails can be formed to route different components. In one example, the layout design shown in FIG. 12A also includes layout patterns 1270A-1270D that indicate dimensions and/or locations of front side metal rails (e.g., M0 rails), and layout pattern 1280 that indicates a dimension and/or a location of front side metal rail (e.g., M1 rail). In one example, the layout design shown in FIG. 12B also includes layout patterns 1240A-1240D that indicate dimensions and/or locations of backside metal rails (e.g., M−1 rails). According to the layout design shown FIGS. 12A-12B, cross-coupled connections 840A, 840B can be formed through the front side metal rails (e.g., M1 rail and M0 rails). Moreover, drain regions or source regions of transistors can be locally routed through the backside metal rails (e.g., M−1 rails).

Figure 13A:
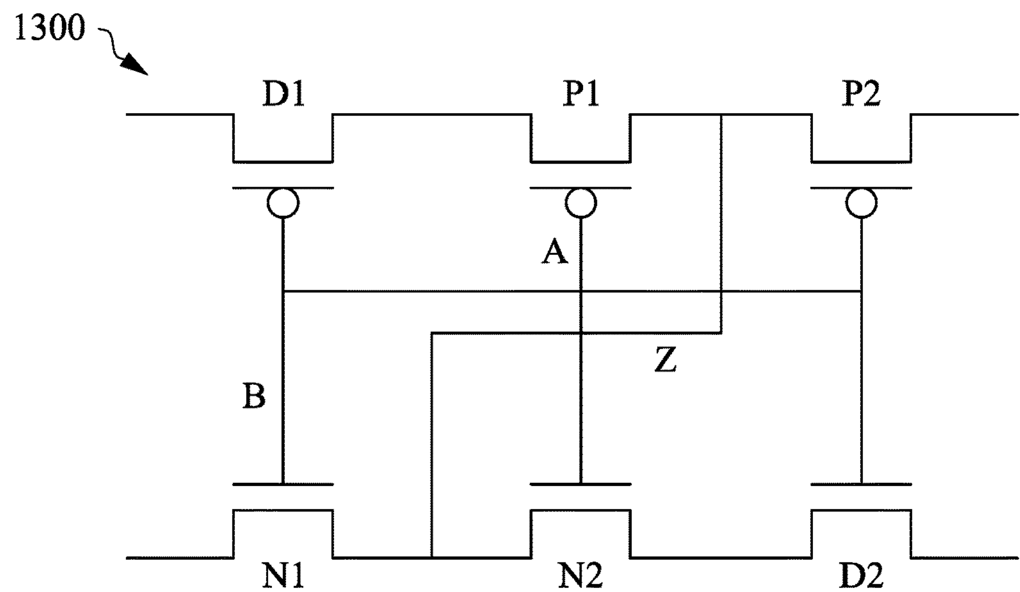
FIG. 13A is a schematic diagram of an example multiplexer circuit, in accordance with one embodiment.

FIG. 13A is a schematic diagram of an example circuit 1300, in accordance with one embodiment. In one configuration, the circuit 1300 is similar to the multiplexer circuit 800 of FIG. 8A, except dummy transistors D1, D2 are added. Thus, detailed description of duplicated portion is omitted herein for the sake of brevity. In one aspect, the dummy transistors D1, D2 allow ease of placement and routing of different components.

Figure 13B:
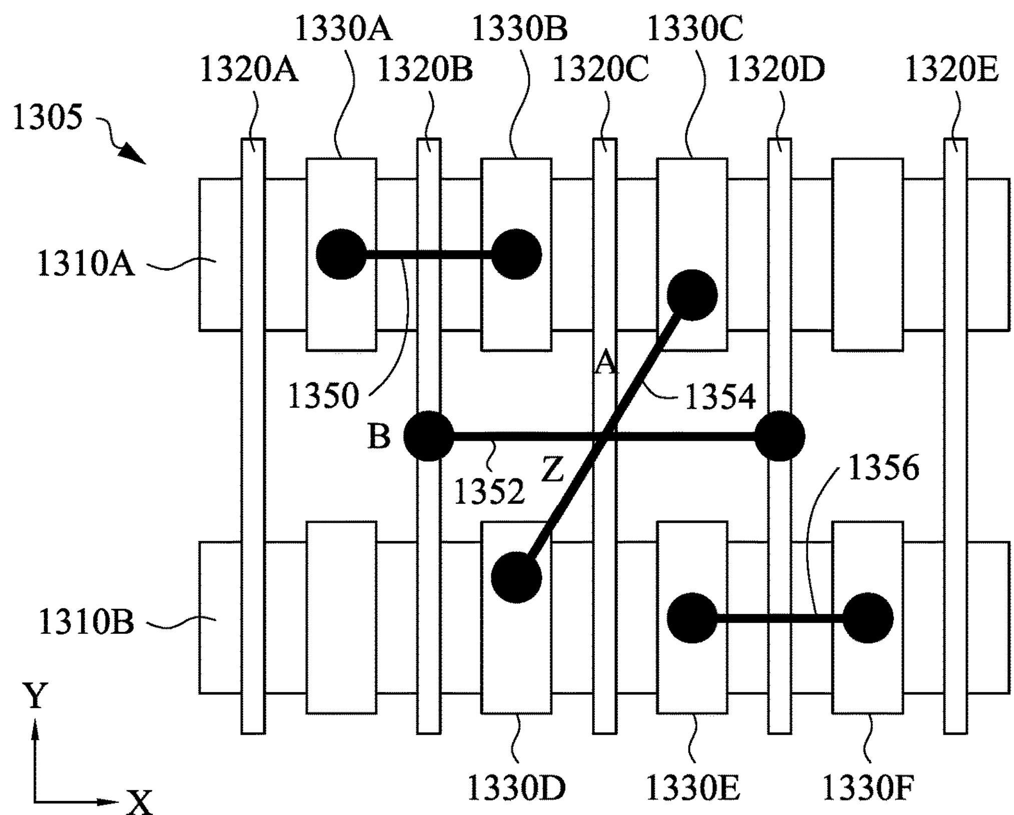
FIG. 13B is a top plan view of a layout design of the example multiplexer circuit of FIG. 13A, in accordance with one embodiment.

FIG. 13B is top plan views 1305 of a layout design of the example circuit 1300 of FIG. 13A, in accordance with one embodiment. In one aspect, the layout design shown in FIG. 13B includes layout patterns 1310A, 1310B that indicate dimensions and/or locations of active regions, and layout patterns 1320A-1320E that indicate dimensions and/or locations of gate regions. The layout patterns 1310A, 1310B may extend in the X-direction, and the layout patterns 1320A-1320E may extend in the Y-direction. As described above with respect to FIG. 1B, transistors can be formed where layout patterns 1310A, 1310B for the active regions and the layout patterns 1320A-1320E for the gate regions intersect.

In some embodiments, front side metal rails and/or backside metal rails may be used for local routing. In one example, a drain region and a source region of a transistor formed according to the layout patterns 1330A, 1330B can be shorted or electrically coupled to each other through a local interconnect 1350 to form the dummy transistor D1. In one example, gate regions formed according to the layout patterns 1320B, 1320D can be shorted or electrically connected to each other through a local interconnect 1352. The local interconnect 1352 can be assigned to or coupled to the control port B of the circuit 1300. In one example, a drain region or a source region of a transistor formed according to the layout pattern 1330C and a drain region or a source region of a transistor formed according to the layout pattern 1330D can be shorted or electrically connected to each other through a local interconnect 1354. The local interconnect 1354 can be assigned to or coupled to the output port Z of the circuit 1300. Similarly, in one example, a drain region and a source region of a transistor formed according to the layout patterns 1330E, 1330F can be shorted or electrically coupled to each other through a local interconnect 1356 to form the dummy transistor D2. The local interconnects 1350, 1352, 1354, 1356 may be metal rails in M−2 layer, M−1 layer, M0 layer, M1 layer, or any combination of them.

In one aspect, backside metal rails allow flexibilities in placement and routing of components, such that layout patterns 1320A-1320E, 1330A-1330F can have regular or consistent shapes. For example, the layout patterns 1320A-1320E for forming gate regions can have same or similar shapes and extend across layout patterns 1330A, 1330B for forming active region. For example, the layout patterns 1330A-1330E for forming source/drain regions and/or MD regions can have same or similar shapes with aligned edges. Advantageously, such regular or consistent shapes of the layout patterns 1320A-1320E, 1330A-1330F allow components of transistors (e.g., gate regions, source/drain regions) to be formed in a consistent manner, such that characteristics of transistors can be more consistent. Moreover, the circuit 1300 can be formed in a compact form, because a number of front side metal rails and via contacts can be reduced.

Figure 13C:
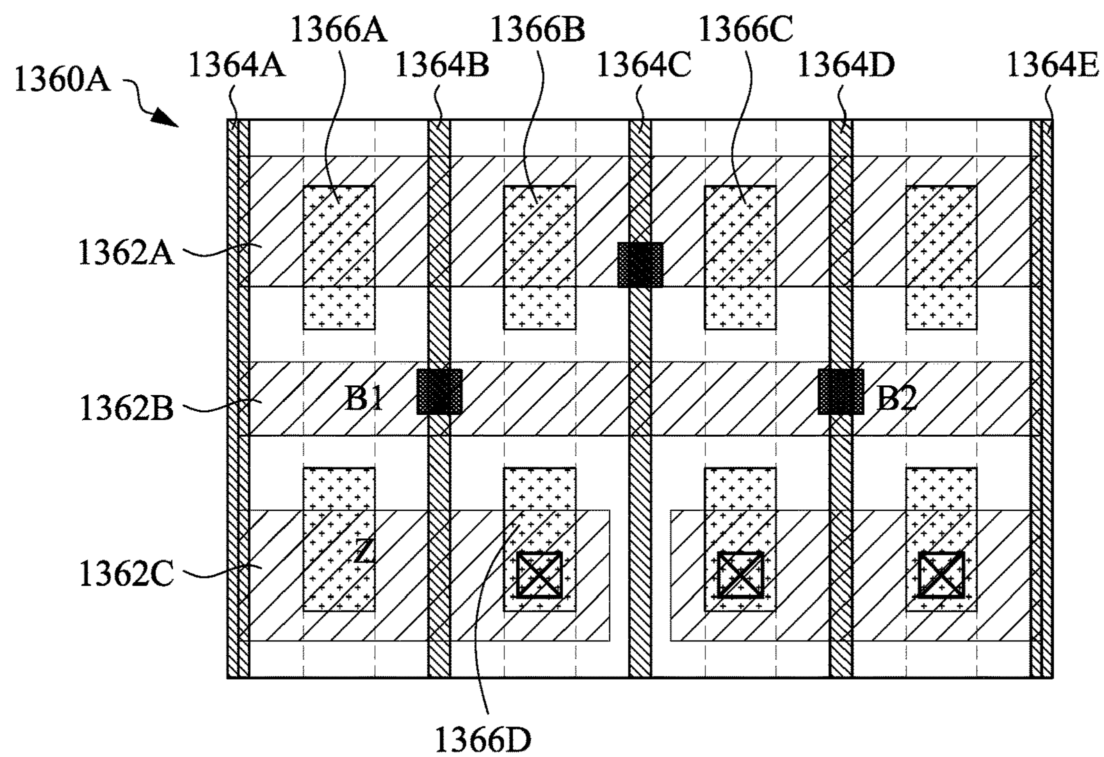
FIGS. 13C-13D are top plan views of a layout design of the example multiplexer circuit of FIG. 13A including backside metal rails, in accordance with one embodiment.
Figure 13D:
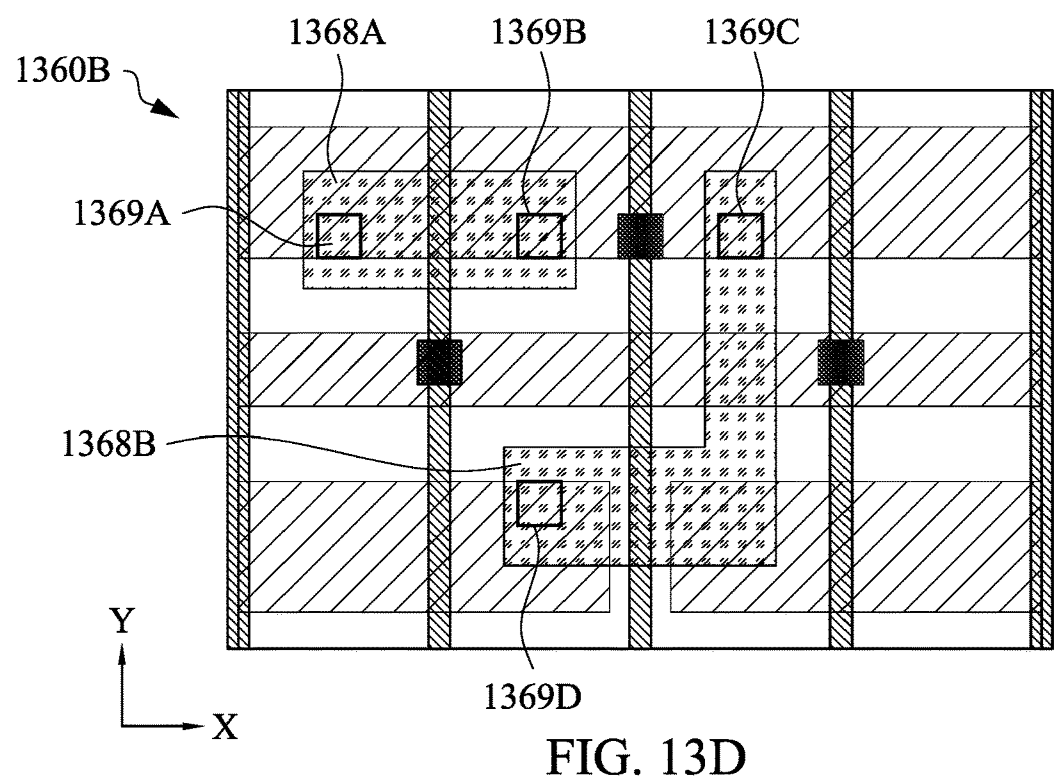

FIGS. 13C-13D are top plan views 1360A, 1360B of a layout design of the example multiplexer circuit 1300 of FIG. 13A including backside metal rails, in accordance with one embodiment. In one aspect, the top plan views 1360A, 1360B of a layout design show layout patterns for components in different layers of the integrated circuit. In one aspect, the layout design shown in FIG. 13C includes layout patterns 1366A-1366D that indicate dimensions and/or locations of active regions, and layout patterns 1364A-1364E that indicate dimensions and/or locations of gate regions.

In one aspect, front side metal rails and backside metal rails can be formed to route different components. In one example, the layout design shown in FIG. 13C also includes layout patterns 1362A-1362C that indicate dimensions and/or locations of front side metal rails (e.g., M0 rails). In one example, the layout design shown in FIG. 13D also includes layout patterns 1368A-1368B that indicate dimensions and/or locations of backside metal rails (e.g., M−1 rails). According to the layout design shown FIGS. 13C-13D, cross-coupled connections 1352, 1354 can be formed through the front side metal rails (e.g., M1 rail and M0 rails) and backside metal rails (e.g., M−1 rail). In one example, a drain region or a source region of a transistor formed according to the layout pattern 1366A can be electrically connected to a backside metal rail (e.g., M−1 rail) formed according to the layout pattern 1368A through a via contact formed according to a layout pattern 1369A. Similarly, a source region or a drain region of the transistor formed according to the layout pattern 1366B can be electrically connected to the backside metal rail (e.g., M−1 rail) formed according to the layout pattern 1368A through a via contact formed according to a layout pattern 1369B. In one example, a drain region or a source region of a transistor formed according to the layout pattern 1366C can be electrically connected to a backside metal rail (e.g., M−1 rail) formed according to the layout pattern 1368B through a via contact formed according to a layout pattern 1369C. Similarly, a drain region or a source region of a transistor formed according to the layout pattern 1366D can be electrically connected to the backside metal rail (e.g., M−1 rail) formed according to the layout pattern 1368B through a via contact formed according to a layout pattern 1369D. Hence, different transistors formed according to the layout patterns 1366C, 1366D can be electrically connected to each other through a backside metal rail formed according to the layout pattern 1368B. In this example shown in FIGS. 13C and 13D, the layout patterns 1368A, 1368B can extend in both X and Y directions to allow the layout patterns 1366A-1366D for the source/drain regions to have regular or a consistent structure.

Figure 13E:
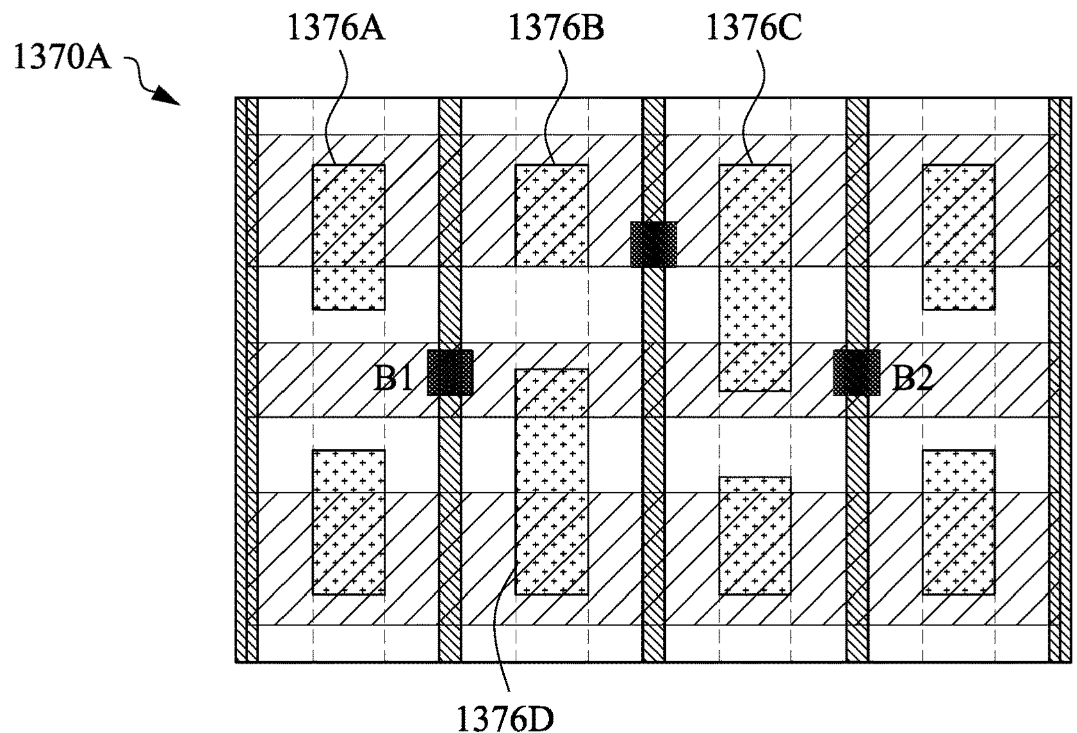
FIGS. 13E-13F are top plan views of a layout design of the example multiplexer circuit of FIG. 13A including backside metal rails, in accordance with one embodiment.
Figure 13F:
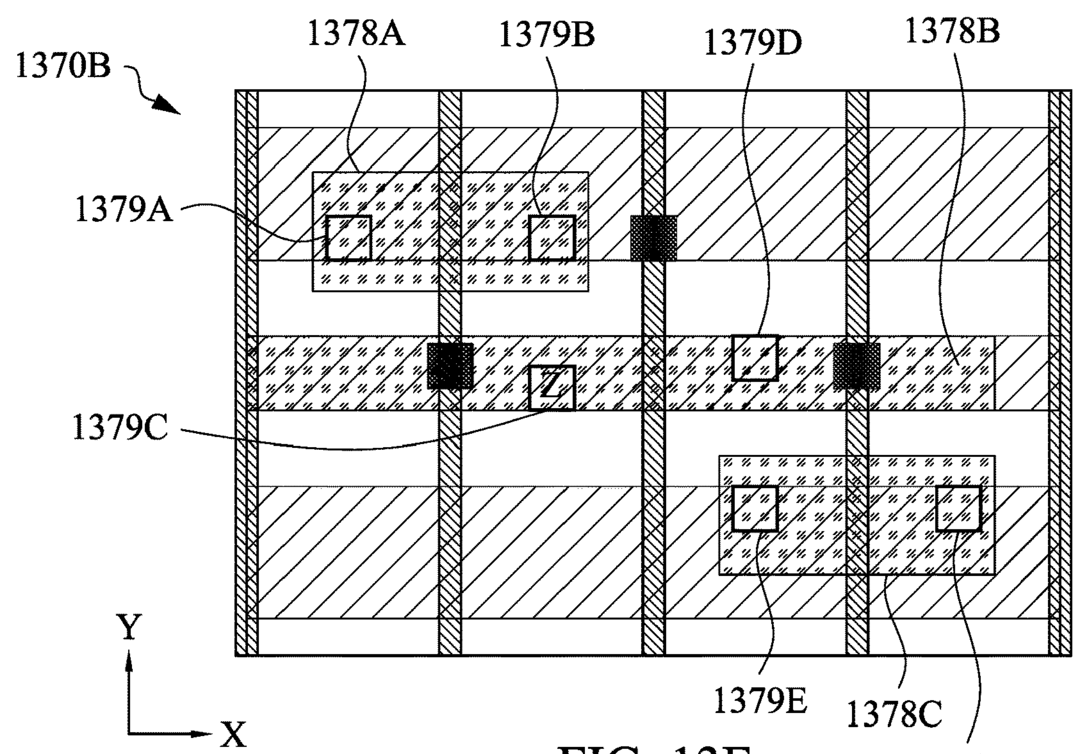

FIGS. 13E-13F are top plan views 1370A, 1370B of a layout design of the example multiplexer circuit 1300 of FIG. 13A including backside metal rails, in accordance with one embodiment. In one aspect, the top plan views 1370A, 1370B of a layout design show layout patterns for components in different layers of the integrated circuit. In one aspect, the layout design shown in FIGS. 13E and 13F are similar to the layout design shown in FIGS. 13C and 13D except the layout design shown in FIGS. 13E and 13F includes layout patterns 1376A-1376D that indicate dimensions and/or locations of source/drain regions with varying length, and layout patterns 1378A-1378C that indicate dimensions and/or locations of backside metal rails (e.g., M−1 rail) extending in the X-direction. For example in FIG. 13E, the layout patterns 1376C and 1376D extend in the Y-direction to partially overlap the layout pattern 1378B extending in the X-direction. In one aspect, a drain region or a source region of a transistor formed according to the layout pattern 1376C can be electrically connected to a backside metal rail formed according to the layout pattern 1378B through a via contact formed according to a layout pattern 1379D. Similarly, a drain region or a source region of a transistor formed according to the layout pattern 1376D can be electrically connected to the backside metal rail formed according to the layout pattern 1378B through a via contact formed according to a layout pattern 1379C. Hence, the layout patterns 1376A-1376D can have varying structure, when the layout patterns 1378A-1378C extend in one direction (e.g., X-direction).

Figure 13G:
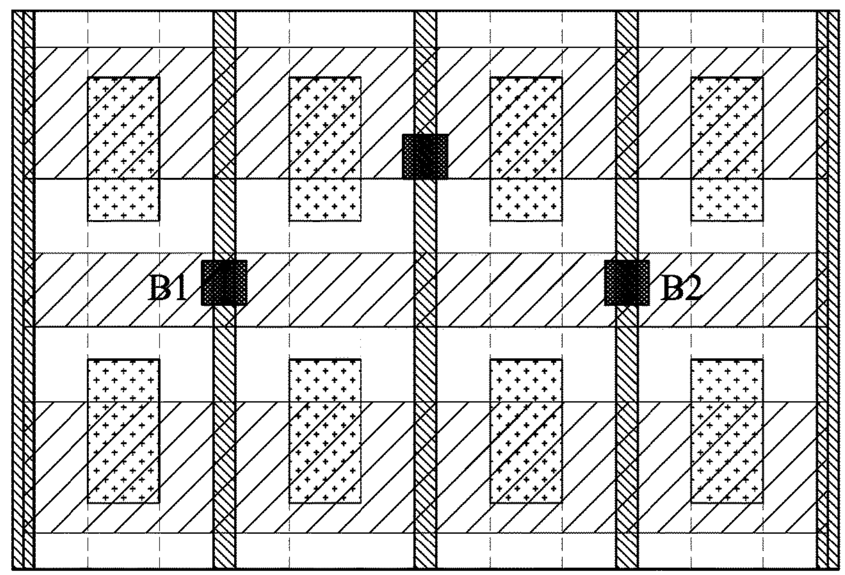
FIGS. 13G-13I are top plan views of a layout design of the example multiplexer circuit of FIG. 13A including backside metal rails, in accordance with one embodiment.
Figure 13H:
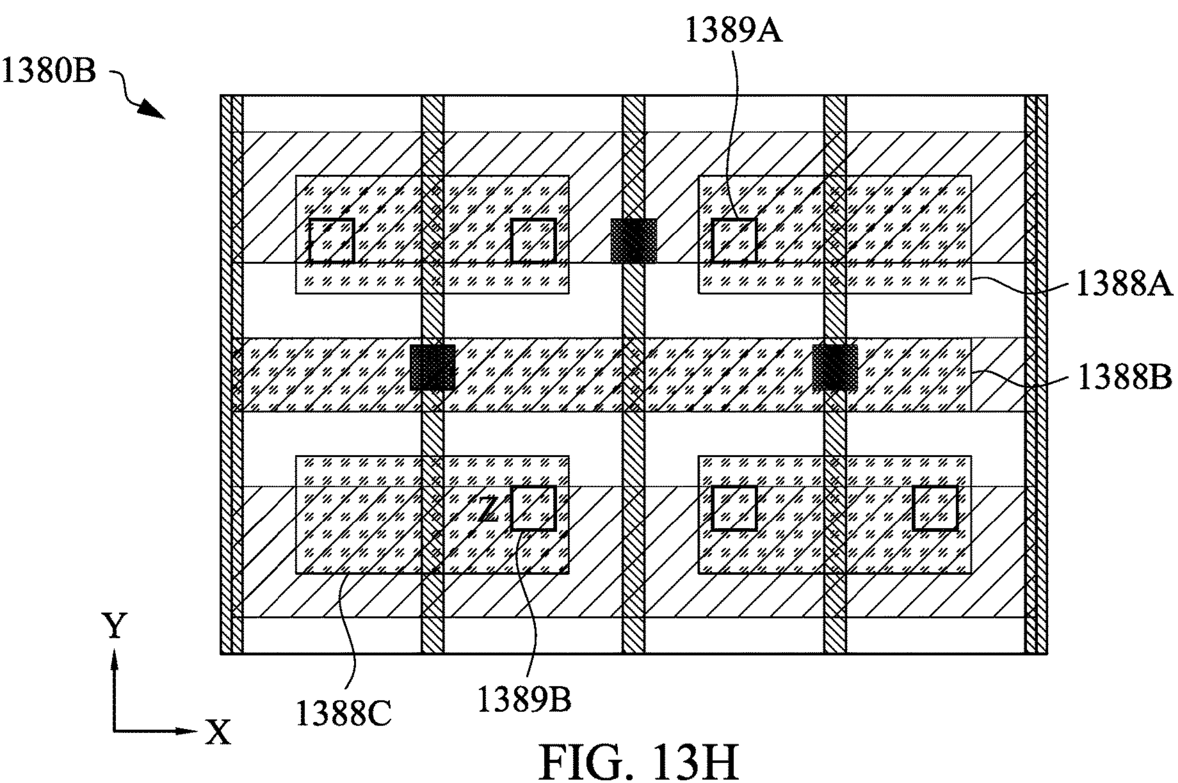
Figure 13I:
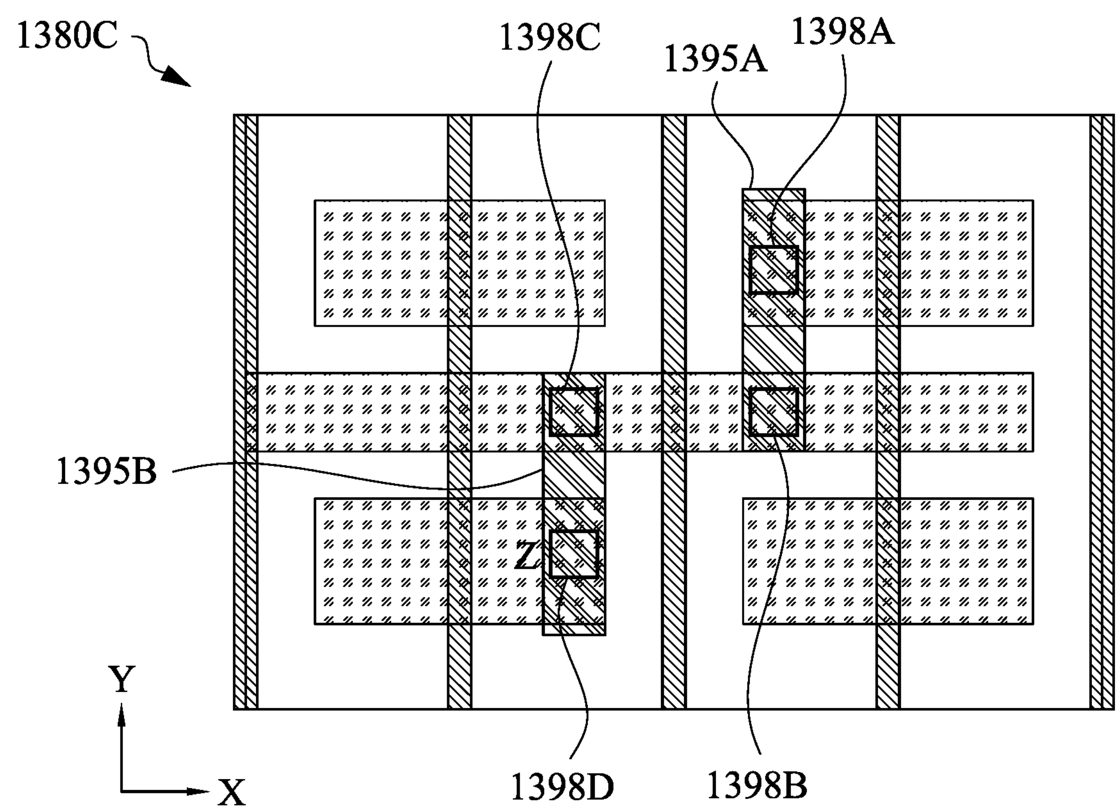

FIGS. 13G-13I are top plan views 1380A-1380C of a layout design of the example multiplexer circuit 1300 of FIG. 13A including backside metal rails, in accordance with one embodiment. In one aspect, the top plan views 1380A-1380C of a layout design show layout patterns for components in different layers of the integrated circuit. In one aspect, the layout design shown in FIGS. 13G-13I are similar to the layout design shown in FIGS. 13C and 13D except the layout design shown in FIGS. 13G-13I includes layout patterns 1388A-1388C that indicate dimensions and/or locations of backside metal rails (e.g., M−1 rail) extending in the X-direction and layout patterns 1395A-1395B for different backside metal rails (e.g., M−2 rail) extending in the Y-direction. In one aspect, transistors can be connected through backside metal rails (e.g., M−1 rail) formed according to the layout patterns 1388A-1388C, backside metal rails (e.g., M−2 rail) formed according to the layout patterns 1395A-1395B, and via contacts formed according to the layout patterns 1389A-1389B and 1398A-1398D. Employing different layers of backside metal rails can provide flexibility in terms of routing or connecting different components of an integrated circuit. Moreover, the backside metal rails allow flexibilities in placement and routing of components, such that layout patterns for forming transistors (e.g., drain region, source region, and gate region) can have regular or consistent shapes. Advantageously, such regular or consistent shapes of the layout patterns allow components of transistors (e.g., gate regions, source/drain regions) to be formed in a consistent manner, such that characteristics of transistors can be more consistent.

Figure 14B:
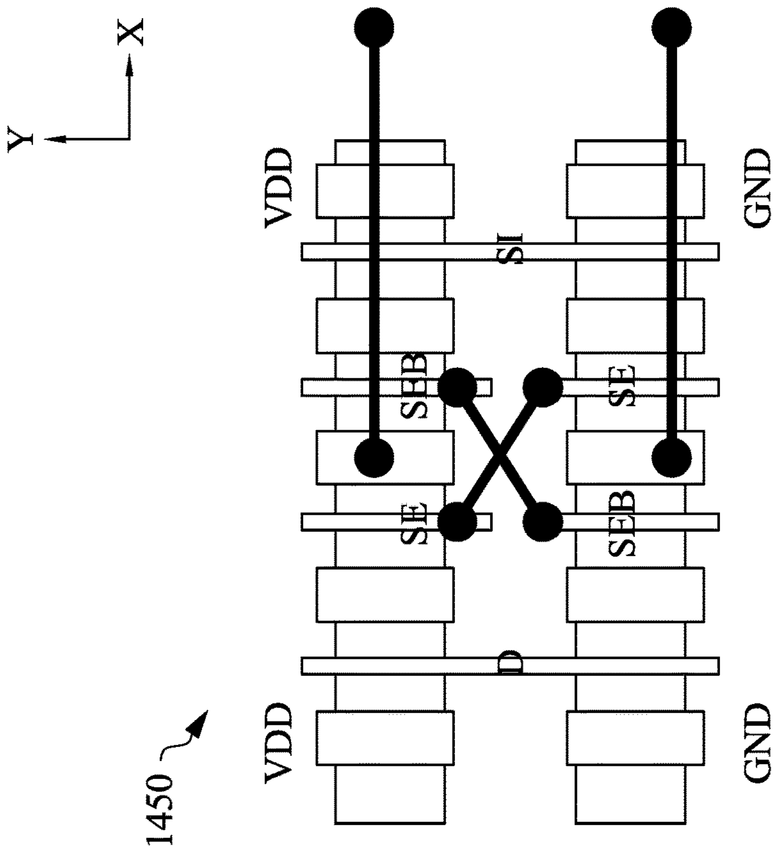
FIG. 14B is a top plan view of a layout design of the example circuit of FIG. 14A, in accordance with one embodiment.
Figure 14A:
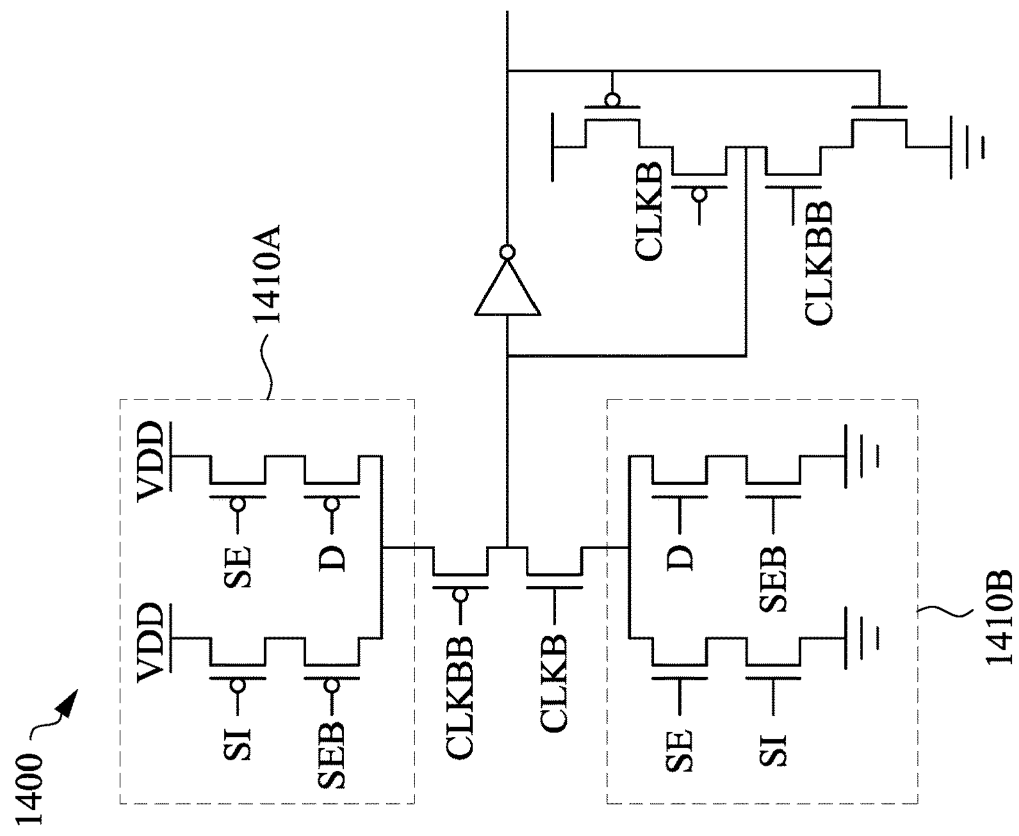
FIG. 14A is a schematic diagram of an example circuit, in accordance with one embodiment.

FIG. 14A is a schematic diagram of an example circuit 1400, in accordance with one embodiment. FIG. 14B is a top plan view 1450 of a layout design of the example circuit of FIG. 14A, in accordance with one embodiment. In one example, the circuit 1400 is implemented as a flip flop circuit. In one aspect, the circuit 1400 includes a first portion 1410A and a second portion 1410B that have similar configuration as the circuit 1300 in FIG. 13A. Hence, the circuit 1300 can be formed with cross coupled connections as shown in FIG. 14B. As described above with respect to FIG. 13B, backside metal rails can be used for local interconnect. Such use of backside metal rails allows flexibilities in placement and routing of components, such that layout patterns for forming transistors (e.g., drain region, source region, and gate region) can have regular or consistent shapes. Advantageously, such regular or consistent shapes of the layout patterns allow components of transistors (e.g., gate regions, source drain regions) to be formed in a consistent manner, such that characteristics of transistors can be more consistent. Moreover, the circuit 1400 can be formed in a compact form, because a number of front side metal rails and via contacts can be reduced.

Figure 15:
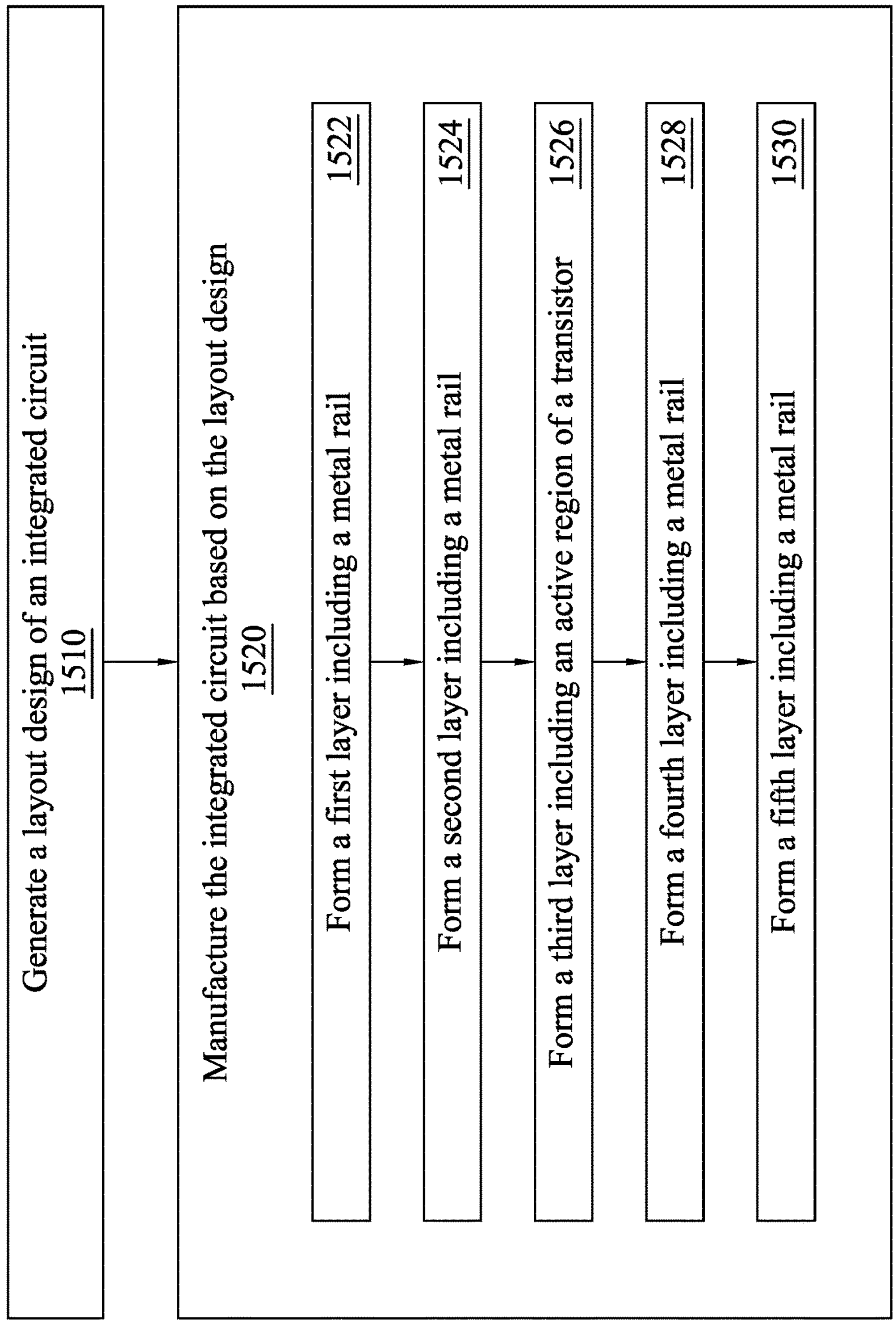
FIG. 15 is a flowchart of a method of manufacturing an integrated circuit, in accordance with some embodiments.

FIG. 15 is a flowchart of a method 1500 of forming or manufacturing an integrated circuit in accordance with some embodiments. It is understood that additional operations may be performed before, during, and/or after the method 1500 depicted in FIG. 15. In some embodiments, the method 1500 is usable to form an integrated circuit according to various layout designs as disclosed herein.

In operation 1510 of the method 1500, a layout design of an integrated circuit is generated. The operation 1510 is performed by a processing device (e.g., processor 1602 of FIG. 16) configured to execute instructions for generating a layout design. In one approach, the layout design is generated by placing layout designs of one or more standard cells through a user interface. In one approach, the layout design is automatically generated by a processor executing a synthesis tool that converts a logic design (e.g., Verilog) into a corresponding layout design. In some embodiments, the layout design is rendered in a graphic database system (GDSII) file format.

In operation 1520 of the method 1500, the integrated circuit is manufactured based on the layout design. In some embodiments, the operation 1520 of the method 1500 comprises manufacturing at least one mask based on the layout design, and manufacturing the integrated circuit based on the at least one mask. In one approach, the operation 1520 includes operations 1522, 1524, 1526, 1528. In operation 1522, a first layer (e.g., BM layer) including a first metal rail (e.g., backside power rail) is formed. In operation 1524, a second layer (e.g., M−2 or M−1 layer) including a second metal rail (e.g., backside metal rail) is formed. In one aspect, the second layer is above the first layer along a direction (e.g., Z-direction). In one approach, a first contact layer (e.g., VB layer) including one or more via contacts can be formed between the first layer and the second layer. The one or more via contacts in the first contact layer (e.g., VB layer) may electrically couple the first metal rail (e.g., backside power rail) and the second metal rail (e.g., backside metal rail). In operation 1526, a third layer (e.g., EPI layer) including an active region of a transistor is formed above the second layer along the direction (e.g., Z-direction). In one approach, a second contact layer (e.g., VDB layer) including one or more via contacts can be formed between the second layer and the third layer. In one aspect, the one or more contacts in the second contact layer (e.g., VDB layer) may electrically couple the transistor and the backside metal rail. In operation 1528, a fourth layer (e.g., MD layer) including a third metal rail (e.g., MD region) is formed above the third layer along the direction (e.g., Z-direction). In some embodiments, the MD region is directly coupled to the active region. In operation 1530, a fifth layer (e.g., M0 layer) including a metal rail (e.g., M0 rail) is formed above the fourth layer along the direction (e.g., Z-direction). In one approach, a third contact layer (e.g., VD layer) including one or more via contacts can be formed between the fourth layer and the fifth layer. The one or more via contacts in the third contact layer (e.g., VD layer) may electrically couple the MD region and the M0 rail.

Advantageously, the backside power rail and backside routing rail allow flexibilities in placement and routing of components, such that layout patterns for forming transistors (e.g., drain structure, source structure, and gate structure) can have regular or consistent shapes. Beneficially, such regular or consistent shapes of the layout patterns allow components (e.g., source/drain regions, gate regions, etc.) of transistors to be formed in a consistent manner, such that characteristics of transistors can be more consistent. Moreover, the integrated circuit can be formed in a compact form, because a number of front side metal rails and via contacts can be reduced.

Figure 16:
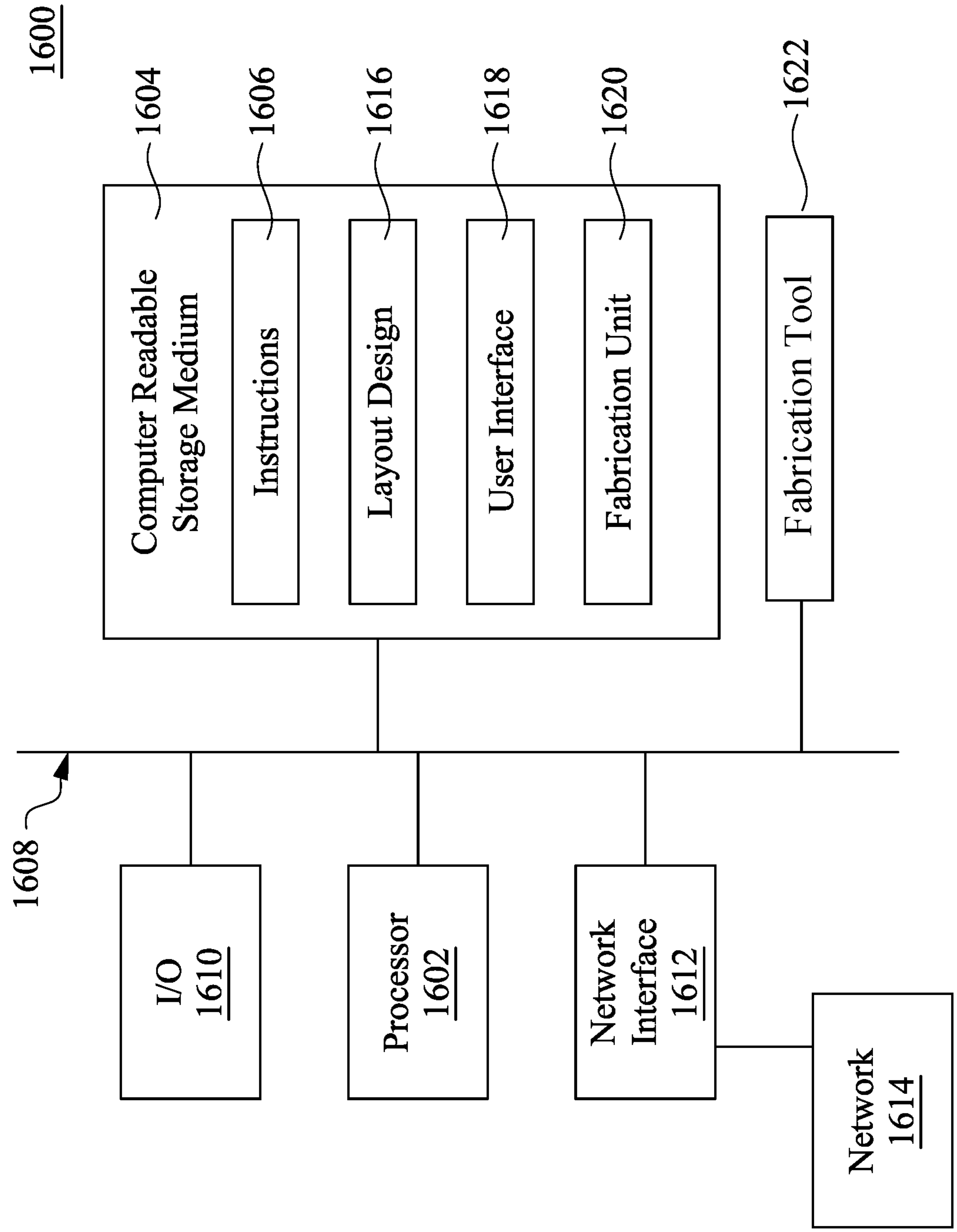
FIG. 16 is a block diagram of a system of generating an IC layout design, in accordance with some embodiments.

FIG. 16 is a schematic view of a system 1600 for designing and manufacturing an IC layout design in accordance with some embodiments. In some embodiments, system 1600 generates or places one or more IC layout designs described herein. In some embodiments, the system 1600 manufactures one or more ICs based on the one or more IC layout designs described herein. The system 1600 includes a hardware processor 1602 and a non-transitory, computer readable storage medium 1604 encoded with, e.g., storing, the computer program code 1606, e.g., a set of executable instructions. Computer readable storage medium 1604 is configured for interfacing with manufacturing machines for producing the integrated circuit. The processor 1602 is electrically coupled to the computer readable storage medium 1604 by a bus 1608. The processor 1602 is also electrically coupled to an I/O interface 1610 by bus 1608. A network interface 1612 is also electrically connected to the processor 1602 by bus 1608. Network interface 1612 is connected to a network 1614, so that processor 1602 and computer readable storage medium 1604 are capable of connecting to external elements via network 1614. The processor 1602 is configured to execute the computer program code 1606 encoded in the computer readable storage medium 1604 in order to cause system 1600 to be usable for performing a portion or all of the operations as described in method 1500.

In some embodiments, the processor 1602 is a central processing unit (CPU), a multi-processor, a distributed processing system, an application specific integrated circuit (ASIC), and/or a suitable processing unit.

In some embodiments, the computer readable storage medium 1604 is an electronic, magnetic, optical, electromagnetic, infrared, and/or a semiconductor system (or apparatus or device). For example, the computer readable storage medium 1604 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1604 includes a compact disk-read only memory (CD-ROM), a compact disk-read/write (CD-R/W), and/or a digital video disc (DVD).

In some embodiments, the storage medium 1604 stores the computer program code 1606 configured to cause system 1600 to perform method 1500. In some embodiments, the storage medium 1604 also stores information needed for performing method 1500 as well as information generated during performance of method 1500, such as layout design 1616 and user interface 1618 and fabrication unit 1620, and/or a set of executable instructions to perform the operation of method 1500.

In some embodiments, the storage medium 1604 stores instructions (e.g., computer program code 1606) for interfacing with manufacturing machines. The instructions (e.g., computer program code 1606) enable processor 1602 to generate manufacturing instructions readable by the manufacturing machines to effectively implement method 1500 during a manufacturing process.

System 1600 includes I/O interface 1610. I/O interface 1610 is coupled to external circuitry. In some embodiments, I/O interface 1610 includes a keyboard, keypad, mouse, trackball, trackpad, and/or cursor direction keys for communicating information and commands to processor 1602.

System 1600 also includes network interface 1612 coupled to the processor 1602. Network interface 1612 allows system 1600 to communicate with network 1614, to which one or more other computer systems are connected. Network interface 1612 includes wireless network interfaces such as BLUETOOTH, WIFI, WIMAX, GPRS, or WCDMA; or wired network interface such as ETHERNET, USB, or IEEE-13154. In some embodiments, method 1500 is implemented in two or more systems 1600, and information such as layout design, user interface and fabrication unit are exchanged between different systems 1600 by network 1614.

System 1600 is configured to receive information related to a layout design through I/O interface 1610 or network interface 1612. The information is transferred to processor 1602 by bus 1608 to determine a layout design for producing an IC. The layout design is then stored in computer readable medium 1604 as layout design 1616. System 1600 is configured to receive information related to a user interface through I/O interface 1610 or network interface 1612. The information is stored in computer readable medium 1604 as user interface 1618. System 1600 is configured to receive information related to a fabrication unit through I/O interface 1610 or network interface 1612. The information is stored in computer readable medium 1604 as fabrication unit 1620. In some embodiments, the fabrication unit 1620 includes fabrication information utilized by system 1600.

In some embodiments, method 1500 is implemented as a standalone software application for execution by a processor. In some embodiments, method 1500 is implemented as a software application that is a part of an additional software application. In some embodiments, method 1500 is implemented as a plug-in to a software application. In some embodiments, method 1500 is implemented as a software application that is a portion of an EDA tool. In some embodiments, method 1500 is implemented as a software application that is used by an EDA tool. In some embodiments, the EDA tool is used to generate a layout design of the integrated circuit device. In some embodiments, the layout design is stored on a non-transitory computer readable medium. In some embodiments, the layout design is generated using a tool such as VIRTUOSO® available from CADENCE DESIGN SYSTEMS, Inc., or another suitable layout generating tool. In some embodiments, the layout design is generated based on a netlist which is created based on the schematic design. In some embodiments, method 1500 is implemented by a manufacturing device to manufacture an integrated circuit using a set of masks manufactured based on one or more layout designs generated by system 1600. In some embodiments, system 1600 is a manufacturing device (e.g., fabrication tool 1622) to manufacture an integrated circuit using a set of masks manufactured based on one or more layout designs of the present disclosure. In some embodiments, system 1600 of FIG. 16 generates layout designs of an IC that are smaller than other approaches. In some embodiments, system 1600 of FIG. 16 generates layout designs of an IC that occupy less area than other approaches.

Figure 17:
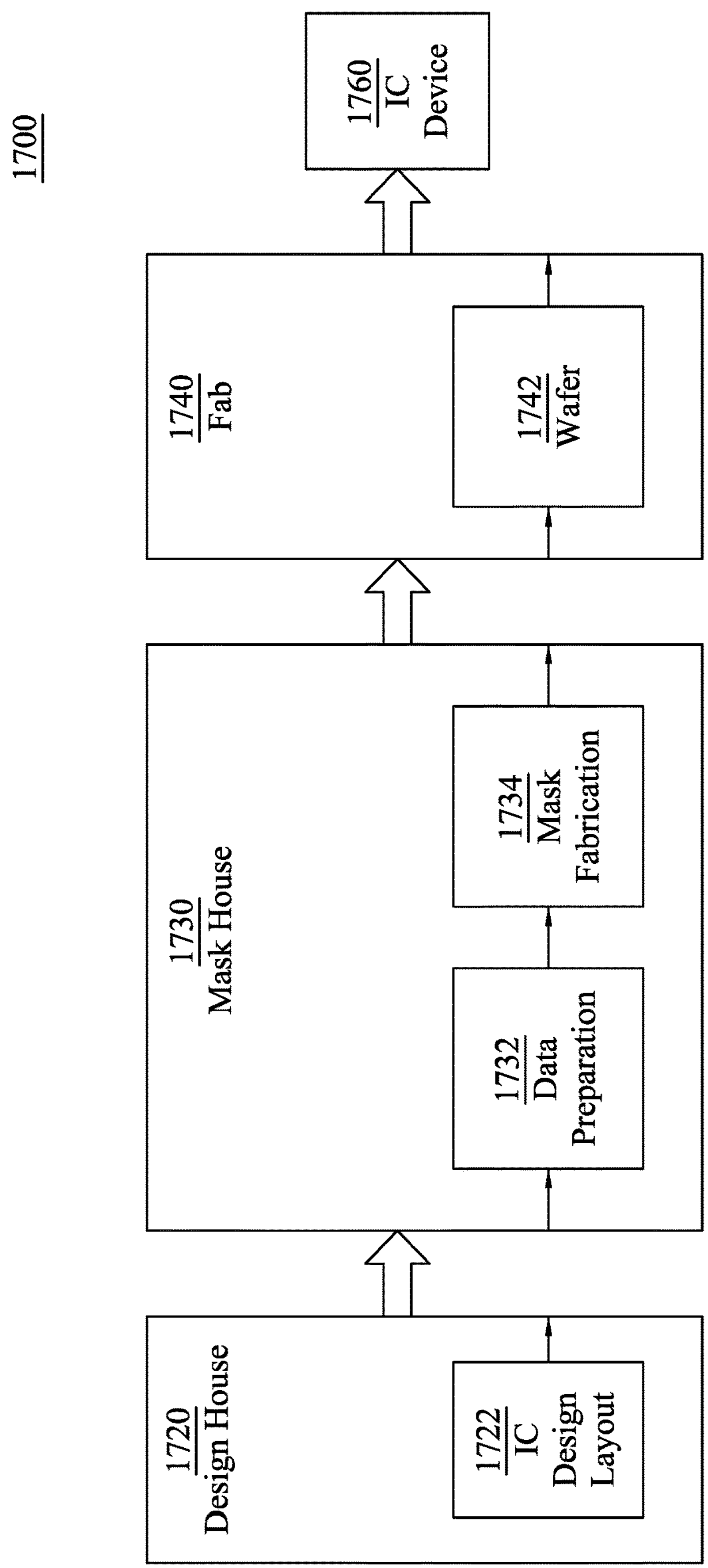
FIG. 17 is a block diagram of an IC manufacturing system, and an IC manufacturing flow associated therewith, in accordance with at least one embodiment of the present disclosure.

FIG. 17 is a block diagram of an integrated circuit (IC) manufacturing system 1700, and an IC manufacturing flow associated therewith, in accordance with at least one embodiment of the present disclosure.

In FIG. 17, IC manufacturing system 1700 includes entities, such as a design house 1720, a mask house 1730, and an IC manufacturer/fabricator ("fab") 1740, that interact with one another in the design, development, and manufacturing cycles and/or services related to manufacturing an IC device 1760. The entities in system 1700 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1720, mask house 1730, and IC fab 1740 is owned by a single company. In some embodiments, two or more of design house 1720, mask house 1730, and IC fab 1740 coexist in a common facility and use common resources.

Design house (or design team) 1720 generates an IC design layout 1722. IC design layout 1722 includes various geometrical patterns designed for an IC device 1760. The geometrical patterns correspond to patterns of metal, oxide, or semiconductor layers that make up the various components of IC device 1760 to be fabricated. The various layers combine to form various IC features. For example, a portion of IC design layout 1722 includes various IC features, such as an active region, gate structure, source structure and drain structure, metal lines or via contacts of an interlayer interconnection, and openings for bonding pads, to be formed in a semiconductor substrate (such as a silicon wafer) and various material layers disposed on the semiconductor substrate. Design house 1720 implements a proper design procedure to form IC design layout 1722. The design procedure includes one or more of logic design, physical design or place and route. IC design layout 1722 is presented in one or more data files having information of the geometrical patterns. For example, IC design layout 1722 can be expressed in a GDSII file format or DFII file format.

Mask house 1730 includes mask data preparation 1732 and mask fabrication 1734. Mask house 1730 uses IC design layout 1722 to manufacture one or more masks to be used for fabricating the various layers of IC device 1760 according to IC design layout 1722. Mask house 1730 performs mask data preparation 1732, where IC design layout 1722 is translated into a representative data file ("RDF"). Mask data preparation 1732 provides the RDF to mask fabrication 1734. Mask fabrication 1734 includes a mask writer. A mask writer converts the RDF to an image on a substrate, such as a mask (reticle) or a semiconductor wafer. The design layout is manipulated by mask data preparation 1732 to comply with particular characteristics of the mask writer and/or requirements of IC fab 1740. In FIG. 17, mask data preparation 1732 and mask fabrication 1734 are illustrated as separate elements. In some embodiments, mask data preparation 1732 and mask fabrication 1734 can be collectively referred to as mask data preparation.

In some embodiments, mask data preparation 1732 includes optical proximity correction (OPC) which uses lithography enhancement techniques to compensate for image errors, such as those that can arise from diffraction, interference, other process effects and the like. OPC adjusts IC design layout 1722. In some embodiments, mask data preparation 1732 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1732 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 1734, which may undo part of the modifications performed by OPC in order to meet mask creation rules.

In some embodiments, mask data preparation 1732 includes lithography process checking (LPC) that simulates processing that will be implemented by IC fab 1740 to fabricate IC device 1760. LPC simulates this processing based on IC design layout 1722 to create a simulated manufactured device, such as IC device 1760. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC can be repeated to further refine IC design layout 1722.

It should be understood that the above description of mask data preparation 1732 has been simplified for the purposes of clarity. In some embodiments, mask data preparation 1732 includes additional features such as a logic operation (LOP) to modify the IC design layout according to manufacturing rules. Additionally, the processes applied to IC design layout 1722 during mask data preparation 1732 may be executed in a variety of different orders.

After mask data preparation 1732 and during mask fabrication 1734, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 1734 is used in a variety of processes. For example, such a mask(s) is used in an ion implantation process to form various doped regions in the semiconductor wafer, in an etching process to form various etching regions in the semiconductor wafer, and/or in other suitable processes.

IC fab 1740 is an IC fabrication entity that includes one or more manufacturing facilities for the fabrication of a variety of different IC products. In some embodiments, IC fab 1740 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry entity.

IC fab 1740 uses the mask (or masks) fabricated by mask house 1730 to fabricate IC device 1760. Thus, IC fab 1740 at least indirectly uses IC design layout 1722 to fabricate IC device 1760. In some embodiments, a semiconductor wafer 1742 is fabricated by IC fab 1740 using the mask (or masks) to form IC device 1760. Semiconductor wafer 1742 includes a silicon substrate or other proper substrate having material layers formed thereon. Semiconductor wafer further includes one or more of various doped regions, dielectric features, multilevel interconnects, and the like (formed at subsequent manufacturing steps).

System 1700 is shown as having design house 1720, mask house 1730 or IC fab 1740 as separate components or entities. However, it is understood that one or more of design house 1720, mask house 1730 or IC fab 1740 are part of the same component or entity.

Details regarding an integrated circuit (IC) manufacturing system (e.g., system 1700 of FIG. 17), and an IC manufacturing flow associated therewith are found, e.g., in U.S. Pat. No. 9,256,709, granted Feb. 9, 2016, U.S. Patent Application Publication No. 20150278429, published Oct. 1, 2015, U.S. Patent Application Publication No. 20100040838, published Feb. 6, 2014, and U.S. Pat. No. 7,260,442, granted Aug. 21, 2007, the entireties of each of which are hereby incorporated by reference.

One aspect of this description relates to an integrated circuit. In some embodiments, the integrated circuit includes a first layer including a first metal rail. In some embodiments, the integrated circuit includes a second layer including a second metal rail, where the second layer is above the first layer along a first direction. In some embodiments, the integrated circuit includes a third layer including an active region of a transistor, where the third layer is above the second layer along the first direction. In some embodiments, the integrated circuit includes a fourth layer including a third metal rail, where the fourth layer is above the third layer along the first direction. In some embodiments, the integrated circuit includes a fifth layer including a fourth metal rail, where the fifth layer is above the fourth layer along the first direction.

One aspect of this description relates to a method for forming an integrated circuit. In some embodiments, the method includes forming a first layer including a first metal rail. In some embodiments, the method includes forming a second layer including a second metal rail, where the second layer is above the first layer along a first direction. In some embodiments, the method includes forming a third layer including an active region of a transistor, where the third layer is above the second layer along the first direction. In some embodiments, the method includes forming a fourth layer including a third metal rail, where the fourth layer is above the third layer along the first direction. In some embodiments, the method includes forming a fifth layer including a fourth metal rail, where the fifth layer is above the fourth layer along the first direction.

One aspect of this description relates to an integrated circuit. In some embodiments, the integrated circuit includes a first layer including an active region of a transistor. In some embodiments, the integrated circuit includes a second layer including a first metal rail directly coupled to a first side of the active region of the transistor, where the second layer is above the first layer along a first direction. In some embodiments, the integrated circuit includes a third layer including a second metal rail coupled to a second side of the active region of the transistor through a first via contact, where the second side faces away from the first side. In one aspect, the first layer is above the third layer along the first direction. In some embodiments, the integrated circuit includes a fourth layer including a third metal rail coupled to the second metal rail through a second via contact, where the third layer is above the fourth layer along the first direction. In some embodiments, the integrated circuit includes another active region of the transistor. In some embodiments, the second layer includes a fourth metal rail directly coupled to a first side of the another active region of the transistor. In some embodiments, the third layer includes a fifth metal rail coupled to a second side of the another active region of the transistor through a third via contact. The third metal rail may provide a supply voltage to the active region of the transistor through the second metal rail, where the fifth metal rail may provide an electrical signal to or from the another active region of the transistor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit comprising:

a first layer including a first metal rail;

a second layer including a second metal rail, the second layer above the first layer along a first direction;

a third layer including an active region of a transistor, the third layer above the second layer along the first direction, the active region coupled to the second metal rail through a via contact between the second metal rail and the active region;

a fourth layer including a third metal rail, the fourth layer above the third layer along the first direction; and a fifth layer including a fourth metal rail, the fifth layer above the fourth layer along the first direction.

2. The integrated circuit of claim 1, wherein the first metal rail is to provide a supply voltage to the active region of the transistor through the second metal rail.

3. The integrated circuit of claim 1, wherein the third metal rail is to provide an electrical signal from or to the transistor.

4. The integrated circuit of claim 1, wherein the first metal rail is electrically coupled to the second metal rail through another via contact.

5. The integrated circuit of claim 1, wherein the third metal rail is directly coupled to a second side of the active region of the transistor.

6. The integrated circuit of claim 5, wherein the fourth layer includes:

a fifth metal rail directly coupled to another active region of the transistor.

7. The integrated circuit of claim 6, wherein the third metal rail extends in a second direction perpendicular to the first direction, wherein the third metal rail includes a first end and a second end, and wherein the fifth metal rail extends in the second direction, wherein the fifth metal rail includes a third end and a fourth end, wherein the first end of the third metal rail and the third end of the fifth metal rail are aligned, wherein the second end of the third metal rail and the fourth end of the fifth metal rail are aligned.

8. The integrated circuit of claim 7, wherein the second layer includes:

a sixth metal rail coupled to the another active region of the transistor.

9. The integrated circuit of claim 8, wherein the sixth metal rail is coupled to an active region of another transistor.

10. The integrated circuit of claim 9, further comprising:

a seventh metal rail of the transistor extending in the second direction, the seventh metal rail disposed between the active region of the transistor and the another active region of the transistor, the seventh metal rail partially overlapping the sixth metal rail.

11. The integrated circuit of claim 1, wherein the fourth metal rail extends in a second direction perpendicular to the first direction, wherein the first metal rail extends in the second direction.

12. The integrated circuit of claim 11, wherein the second metal rail extends in a third direction, the first direction normal to the second direction and the third direction.

13. The integrated circuit of claim 11, wherein the second metal rail extends in the second direction.

14. The integrated circuit of claim 1, further comprising:

a sixth layer including a fifth metal rail between the first layer and the second layer, the second metal rail extending in a second direction, the fifth metal rail extending in a third direction, the first direction normal to the second direction and the third direction.

15. A method of forming an integrated circuit, the method comprising:

forming a first layer including a first metal rail;

forming a second layer including a second metal rail, the second layer above the first layer along a first direction;

forming a via contact above the second metal rail along the first direction;

forming a third layer including an active region of a transistor, the third layer above the second layer along the first direction, the via contact to electrically couple between the active region and the second metal rail;

forming a fourth layer including a third metal rail, the fourth layer above the third layer along the first direction; and forming a fifth layer including a fourth metal rail, the fifth layer above the fourth layer along the first direction.

16. The method of claim 15, wherein the first metal rail is to provide a supply voltage to the active region of the transistor through the second metal rail, wherein the third metal rail is to provide an electrical signal from or to the transistor.

17. The method of claim 15, further comprising:

forming another via contact to electrically couple the first metal rail to the second metal rail.

18. An integrated circuit comprising:

a first layer including an active region of a transistor;

a second layer including a first metal rail directly coupled to a first side of the active region of the transistor, the second layer above the first layer along a first direction;

a third layer including a second metal rail coupled to a second side of the active region of the transistor through a first via contact between the second side of the active region and the second metal rail, the second side facing away from the first side, the first layer above the third layer along the first direction; and a fourth layer including a third metal rail coupled to the second metal rail through a second via contact, the third layer above the fourth layer along the first direction.

19. The integrated circuit of claim 18, further comprising:

another active region of the transistor;

wherein the second layer includes a fourth metal rail directly coupled to a first side of the another active region of the transistor; and wherein the third layer includes a fifth metal rail coupled to a second side of the another active region of the transistor through a third via contact.

20. The integrated circuit of claim 19, wherein the third metal rail is to provide a supply voltage to the active region of the transistor through the second metal rail, wherein the fifth metal rail is to provide an electrical signal to or from the another active region of the transistor.

* * * * *